(12) United States Patent
Gao et al.

(10) Patent No.: US 11,745,730 B2
(45) Date of Patent: Sep. 5, 2023

(54) AUTOMATIC PARKING CONTROL METHOD AND APPARATUS

(71) Applicant: GREAT WALL MOTOR COMPANY LIMITED, Baoding (CN)

(72) Inventors: Tong Gao, Baoding (CN); Dongchun Xu, Baoding (CN); Zhichao Fan, Baoding (CN); Hong Wei, Baoding (CN); Jinbiao Bai, Baoding (CN); Shasha Gao, Baoding (CN); Zhen Yang, Baoding (CN); Xiaolong Tian, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 17/765,217

(22) PCT Filed: Nov. 27, 2020

(86) PCT No.: PCT/CN2020/132384
§ 371 (c)(1),
(2) Date: Mar. 30, 2022

(87) PCT Pub. No.: WO2021/104476
PCT Pub. Date: Jun. 3, 2021

(65) Prior Publication Data
US 2022/0340127 A1 Oct. 27, 2022

(30) Foreign Application Priority Data
Nov. 29, 2019 (CN) .......................... 201911206068.4

(51) Int. Cl.
*H04N 5/44* (2011.01)
*B60W 30/06* (2006.01)
(Continued)

(52) U.S. Cl.
CPC .......... *B60W 30/06* (2013.01); *B60W 40/105* (2013.01); *B60W 50/0205* (2013.01);
(Continued)

(58) Field of Classification Search
CPC ............... B60W 30/06; B60W 40/105; B60W 50/0205; B60W 50/14; B60W 2050/0215;
(Continued)

(56) References Cited

U.S. PATENT DOCUMENTS

2009/0030607 A1* 1/2009 Sakata ............... G01C 21/3685
701/533
2012/0253655 A1* 10/2012 Yamada .................. B60L 58/12
340/870.07

(Continued)

FOREIGN PATENT DOCUMENTS

CN 202896566 4/2013
CN 107499307 12/2017
(Continued)

OTHER PUBLICATIONS

Extended European Search Report for EP App. No. 20894171.6, dated Oct. 10, 2022 (8 pages).
(Continued)

*Primary Examiner* — Munear T Akki
(74) *Attorney, Agent, or Firm* — NIXON PEABODY LLP; Jeffrey L. Costellia

(57) ABSTRACT

Provided are an automatic parking control method and apparatus, relating to the industrial field of vehicles. The method comprises: when a speed of a vehicle is in a preset speed range and a time that the speed of the vehicle is in the preset speed range is greater than or equal to a preset time, collecting image data and radar data around the vehicle; inputting the image data and the radar data into a preset convolutional neural network model, and outputting at least
(Continued)

one parking slot information; selecting target parking slot information according to a received parking-in selection operation; and according to the target parking slot information, generating a vehicle parking-in track for the vehicle to automatically park according to the vehicle parking-in track.

19 Claims, 12 Drawing Sheets

(51) Int. Cl.
*G06V 10/82* (2022.01)
*G06V 20/58* (2022.01)
*B60W 40/105* (2012.01)
*B60W 50/02* (2012.01)
*B60W 50/14* (2020.01)
*G01S 13/931* (2020.01)

(52) U.S. Cl.
CPC ........... *B60W 50/14* (2013.01); *G01S 13/931* (2013.01); *G06V 10/82* (2022.01); *G06V 20/586* (2022.01); *B60W 2050/0215* (2013.01); *B60W 2050/146* (2013.01); *B60W 2420/42* (2013.01); *B60W 2420/52* (2013.01); *B60W 2556/20* (2020.02); *B60W 2556/35* (2020.02); *G01S 2013/9314* (2013.01)

(58) Field of Classification Search
CPC ....... B60W 2050/146; B60W 2420/42; B60W 2420/52; B60W 2556/20; B60W 2556/35; B60W 2050/0295; B60W 50/029; B60W 2510/1005; B60W 2520/10; B60W 40/02; B60W 60/0011; B60W 2050/0002; B60W 2050/0005; B60W 2520/06; G01S 13/931; G01S 2013/9314; G06V 10/82; G06V 20/586; B62D 15/0285; G06N 3/06
See application file for complete search history.

(56) References Cited

U.S. PATENT DOCUMENTS

| | | | | |
|---|---|---|---|---|
| 2013/0085637 A1* | 4/2013 | Grimm | .............. | B62D 15/0285 701/25 |
| 2013/0138345 A1* | 5/2013 | Sakaguchi | ......... | G01C 21/3626 701/533 |
| 2014/0176348 A1* | 6/2014 | Acker, Jr. | ................ | G08G 1/04 340/932.2 |
| 2016/0207526 A1 | 7/2016 | Franz et al. | | |
| 2017/0355307 A1 | 12/2017 | Ha et al. | | |
| 2018/0194344 A1* | 7/2018 | Wang | ................... | G05D 1/0088 |
| 2018/0304885 A1* | 10/2018 | Kang | .................... | B60W 10/20 |
| 2019/0220737 A1 | 7/2019 | Yao | | |
| 2019/0228240 A1 | 7/2019 | Stamatopoulos et al. | | |
| 2019/0256144 A1* | 8/2019 | Yamada | ............. | B62D 15/0285 |
| 2020/0346639 A1* | 11/2020 | Tashiro | ................. | B60W 50/14 |

FOREIGN PATENT DOCUMENTS

| | | |
|---|---|---|
| CN | 107776571 | 3/2018 |
| CN | 108860139 | 11/2018 |
| CN | 108875911 | 11/2018 |
| CN | 109017766 | 12/2018 |
| CN | 109466545 | 3/2019 |
| CN | 109808682 | 5/2019 |
| CN | 110182201 | 8/2019 |
| CN | 110239510 | 9/2019 |
| CN | 110901632 | 3/2020 |
| DE | 102006058213 | 7/2008 |
| JP | 2011-016401 | 1/2011 |
| JP | 2018-034645 | 3/2018 |
| JP | 2019-014308 | 1/2019 |
| KR | 10-1371478 | 3/2014 |
| RU | 97312 U1 | 9/2010 |
| WO | WO-2019/181265 | 9/2019 |

OTHER PUBLICATIONS

International Search Report for Application No. PCT/CN2020/132384, dated Feb. 26, 2021, (14 pages).

Chinese Office Action for Application No. 201911206068.4, dated Oct. 19, 2020, (10 pages).

Chinese Search Report for Application No. 2019112060684, dated Oct. 13, 2020, (3 pages).

Japanese Office Action (Application No. 2022-520545) dated Feb. 21, 2023, 8 pages.

* cited by examiner

AUTOMATIC PARKING CONTROL METHOD AND APPARATUS

The present application claims the priority of the Chinese patent application filed on Nov. 29, 2019 before the Chinese Patent Office with the application number of 201911206068.4 and the title of "AUTOMATIC PARKING CONTROL METHOD AND APPARATUS", which is incorporated herein in its entirety by reference.

TECHNICAL FIELD

The present disclosure relates to the industrial field of vehicles, and more particularly, to an automatic parking control method and apparatus.

BACKGROUND

Parking in the city is a difficult thing for people with insufficient driving skills. However, with the development of automobile electronic industry, vehicles are equipped with more and more automation systems. An automatic parking system has become an important means to solve the parking difficulty.

At present, a mainstream automatic parking system is based on a radar sensor and/or an image sensor. In the automatic parking system, the radar sensor is mainly configured to collect distance data between the vehicle and surrounding obstacles, and the image sensor is mainly configured to collect image information around the vehicle. Usually, after a user enables the automatic parking system, the vehicle begins to collect the surrounding data through the radar sensor and the image sensor, and determine a specific position of parking slots near the vehicle to generate a parking track of the vehicle. When the user confirms to start parking, the vehicle may automatically park according to the parking track.

However, the current automatic parking system has multiple shortcomings. Firstly, only when the user selects the automatic parking system, the vehicle starts to search for parking slots, which makes it easy for the user to miss the parking slots that have been already passed. Secondly, the vehicle may only identify normal parking slots with clear markings, but it is not capable to deal with parking slots in complicated situations, resulting in low parking slot identification rate of the vehicle. Thirdly, the vehicle may only provide one parking slot for the user to choose for each time, which is not capable to meet various requirements of the user. Therefore, the current automatic parking system is not perfect by easily affecting the driving experience of the user.

SUMMARY

In view of this, the present disclosure aims to provide an automatic parking control method and apparatus to solve the problems in the prior art that the user is easy to miss the parking slots that have been already passed by the vehicle, the parking slot identification rate of the vehicle is low, and the various demands of the user cannot be met due to the imperfect automatic parking system, so that the driving experience of the user is improved To achieve the above objects, the technical solutions of the present disclosure are implemented as follows:

An automatic parking control method applied to a vehicle comprising a sensor, comprises:

when a speed of the vehicle is in a preset speed range and a time that the speed of the vehicle is in the preset speed range is greater than or equal to a preset time, collecting image data and radar data around the vehicle through the sensor;

inputting the image data and the radar data into a preset convolutional neural network model to acquire at least one parking slot information output by the convolutional neural network model, wherein the convolutional neural network model is trained by image training data and radar training data collected in a plurality of parking slot scenes;

when a current gear of the vehicle is a forward gear or a neutral gear, selecting target parking slot information from the at least one parking slot information according to a received parking-in selection operation; and according to the target parking slot information, generating a vehicle parking-in track for the vehicle to automatically park according to the vehicle parking-in track.

Further, the sensor comprises a plurality of image sensors and a plurality of radar sensors, the vehicle comprises an electronic control unit, and before the step of, when the speed of the vehicle is in the preset speed range and the time that the speed of the vehicle is in the preset speed range is greater than or equal to the preset time, collecting the image data and the radar data around the vehicle through the sensor, the method further comprises:

detecting working states of the plurality of image sensors, the plurality of radar sensors and the electronic control unit when the vehicle is started, wherein the working states comprise a normal state or a fault state; and determining a working level of the vehicle according to the plurality of working states.

Further, the working level of the vehicle comprises any one of a normal level, a first-grade fault level, a second-grade fault level and a third-grade fault level, and the step of determining the working level of the vehicle according to the plurality of working states comprises:

determining that the working level of the vehicle is the normal level when the working states of the plurality of image sensors, the plurality of radar sensors and the electronic control unit are all the normal state;

determining that the working level of the vehicle is the first-grade fault level when the working state of at least one radar sensor and/or the electronic control unit is the fault state;

determining that the working level of the vehicle is the second-grade fault level when the working states of all the image sensors are the fault state; and determining that the working level of the vehicle is the third-grade fault level when the working states of some of the image sensors are the fault state.

Further, the electronic control unit is configured for controlling the vehicle to park automatically, and after the step of determining the working level of the vehicle according to the plurality of working states, the method further comprises:

controlling the electronic control unit to stop working when the working level of the vehicle is the first-grade fault level;

controlling the image sensor to stop working when the working level of the vehicle is the second-grade fault level; and controlling the image sensors the working states of which are the fault state to stop working when the working level of the vehicle is the third-grade fault level.

Further, the parking slot scenes comprise: one or more of a parking slot scene with a traffic cone in the parking slot, a parking slot scene with a no-parking sign in the parking slot, a parking slot scene with a parking lock in the parking slot, a parking slot scene with a tag line in the parking slot and a parking slot scene with an obstacle in the parking slot.

Further, the step of inputting the image data and the radar data into the preset convolutional neural network model to acquire the at least one parking slot information output by the convolutional neural network model comprises:

inputting the image data and the radar data into the convolutional neural network model, so that the convolutional neural network model determines the parking slot information comprising a parking slot type according to the image data and the radar data; and acquiring the parking slot information comprising the parking slot type output by the convolutional neural network model.

Further, after the step that the convolutional neural network model determines the parking slot information comprising the parking slot type according to the image data and the radar data, the method further comprises:

when the parking slot type is an oblique parking slot, determining, by the convolutional neural network model, a parking direction specific to the oblique parking slot according to the image data and the radar data;

wherein, the acquired parking slot information output by the convolutional neural network model further comprises a parking direction of the oblique parking slot.

Further, the step of, when the current gear of the vehicle is the forward gear or the neutral gear, selecting the target parking slot information from the at least one parking slot information according to the received parking-in selection operation, comprises:

when a parking signal is received, when the current gear of the vehicle is the forward gear or the neutral gear, displaying a vehicle parking-in interface, the vehicle parking-in interface comprising the at least one parking slot information; and when the parking-in selection operation specific to the vehicle parking-in interface is received, selecting the target parking slot information from the at least one parking slot information according to the parking-in selection operation.

Further, after the step of, according to the target parking slot information, generating the vehicle parking-in track for the vehicle to automatically park according to the vehicle parking-in track, the method further comprises:

when the parking signal is received, when the current gear of the vehicle is a parking gear, collecting environmental data around the vehicle through the sensor;

determining at least one parking-out direction of the vehicle according to the environmental data;

displaying a vehicle parking-out interface, the vehicle parking-out interface comprising the at least one parking-out direction;

when a parking-out selection operation is received, selecting a target parking-out direction from the parking-out direction according to the parking-out selection operation; and according to the target parking-out direction, generating a vehicle parking-out track for the vehicle to automatically park according to the vehicle parking-out track.

Further, after the step of, according to the target parking slot information, generating the vehicle parking-in track for the vehicle to automatically park according to the vehicle parking-in track, the method further comprises:

when the vehicle is in an abnormal state, controlling the vehicle to suspend automatic parking; and when the vehicle is out of the abnormal state, controlling the vehicle to continue automatic parking.

Further, the abnormal state comprises at least one of the followings:

the vehicle being in a state that a seat belt of a driver seat is unfastened;

the vehicle being in a state that a door of the vehicle is unclosed; and a state that an obstacle appears in the vehicle parking-in track.

An automatic parking control apparatus comprises:

a first collection processor configured for, when a speed of the vehicle is in a preset speed range and a time that the speed of the vehicle is in the preset speed range is greater than or equal to a preset time, collecting image data and radar data around the vehicle through a sensor;

a neural network processor configured for inputting the image data and the radar data into a preset convolutional neural network model to acquire at least one parking slot information output by the convolutional neural network model, wherein the convolutional neural network model is trained by image training data and radar training data collected in a plurality of parking slot scenes;

a parking-in selection processor configured for, when a current gear of the vehicle is a forward gear or a neutral gear, selecting target parking slot information from the at least one parking slot information according to a received parking-in selection operation; and a parking-in track processor configured for, according to the target parking slot information, generating a vehicle parking-in track for the vehicle to automatically park according to the vehicle parking-in track.

Further, the apparatus further comprises:

a detection processor configured for detecting working states of the plurality of image sensors, the plurality of radar sensors and an electronic control unit when the vehicle is started, wherein the working states comprise a normal state or a fault state; and a working level processor configured for determining a working level of the vehicle according to the plurality of working states.

Further, the working level processor comprises:

a first sub-processor configured for determining that the working level of the vehicle is the normal level when the working states of the plurality of image sensors, the plurality of radar sensors and the electronic control unit are all the normal state;

a second sub-processor configured for determining that the working level of the vehicle is the first-grade fault level when the working state of at least one radar sensor and/or the electronic control unit is the fault state;

a third sub-processor configured for determining that the working level of the vehicle is the second-grade fault level when the working states of all the image sensors are the fault state; and a fourth sub-processor configured for determining that the working level of the vehicle is the third-grade fault level when the working states of some of the image sensors are the fault state.

Further, the apparatus further comprises:

a first control processor configured for controlling the electronic control unit to stop working when the working level of the vehicle is the first-grade fault level;

a second control processor configured for controlling the image sensor to stop working when the working level of the vehicle is the second-grade fault level; and a third control processor configured for controlling the image sensors the working states of which are the fault state to stop working when the working level of the vehicle is the third-grade fault level.

Further, the parking slot scenes comprise: one or more of a parking slot scene with a traffic cone in the parking slot, a parking slot scene with a no-parking sign in the parking slot, a parking slot scene with a parking lock in the parking slot, a parking slot scene with a tag line in the parking slot and a parking slot scene with an obstacle in the parking slot.

Further, the neural network processor comprises:

an input submodule configured for inputting the image data and the radar data into the convolutional neural network model, so that the convolutional neural network model determines the parking slot information comprising a parking slot type according to the image data and the radar data; and a first output submodule configured for acquiring the parking slot information comprising the parking slot type output by the convolutional neural network model.

Further, the neural network processor further comprises:

an oblique parking slot submodule configured for, when the parking slot type is an oblique parking slot, determining, by the convolutional neural network model, a parking direction specific to the oblique parking slot according to the image data and the radar data; wherein, the acquired parking slot information output by the convolutional neural network model further comprises a parking direction of the oblique parking slot.

Further, the parking-in selection processor comprises:

a display submodule configured for, when a parking signal is received, when the current gear of the vehicle is the forward gear or the neutral gear, displaying a vehicle parking-in interface, the vehicle parking-in interface comprising the at least one parking slot information; and a selection submodule configured for, when the parking-in selection operation specific to the vehicle parking-in interface is received, selecting the target parking slot information from the at least one parking slot information according to the parking-in selection operation.

Further, the apparatus further comprises:

a second collection processor configured for, when the parking signal is received, when the current gear of the vehicle is a parking gear, collecting environmental data around the vehicle through the sensor;

a determining processor configured for determining at least one parking-out direction of the vehicle according to the environmental data;

a display processor configured for displaying a vehicle parking-out interface, the vehicle parking-out interface comprising the at least one parking-out direction;

a parking-out selection processor configured for, when a parking-out selection operation is received, selecting a target parking-out direction from the parking-out direction according to the parking-out selection operation; and a parking-out track processor configured for, according to the target parking-out direction, generating a vehicle parking-out track for the vehicle to automatically park according to the vehicle parking-out track.

Further, the apparatus further comprises:

a parking suspension module configured for, when the vehicle is in an abnormal state, controlling the vehicle to suspend automatic parking; and a parking continuing module configured for, when the vehicle is out of the abnormal state, controlling the vehicle to continue automatic parking.

Further, the abnormal state comprises at least one of the followings:

the vehicle being in a state that a seat belt of a driver seat is unfastened;

the vehicle being in a state that a door of the vehicle is unclosed; and a state that an obstacle appears in the vehicle parking-in track.

Compared with the prior art, the automatic parking control method and apparatus according to the present disclosure have the following advantages:

The automatic parking control method and apparatus provided by the embodiments of the present disclosure comprise: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identified by the convolutional neural network model; and further, various parking requirements of a user may be met by providing a plurality of parking slots for parking, thereby perfecting an automatic parking system, and improving the driving experience of the user.

The above description is merely a summary of the technical solutions of the present disclosure. In order to more clearly know the technical means of the present disclosure to enable the implementation according to the contents of the description, and in order to make the above and other objects, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the drawings that are required to describe the embodiments or the prior art will be briefly introduced below. Apparently, the drawings that are described below are embodiments of the present disclosure, and a person skilled in the art may obtain other drawings according to these drawings without paying creative work.

Drawings constituting a part of the present disclosure here serve to provide a further understanding of the present disclosure, and the illustrative embodiments of the present disclosure and together with the description thereof serve to explain the present disclosure, and do not constitute inappropriate restriction to the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall in the protection scope of the present disclosure.

It should be noted that, in case of no conflict, the embodiments in the present disclosure and the features in the embodiments may be combined with each other.

The present disclosure will be explained in detail with reference to the accompanying drawings and embodiments hereinafter.

Figure 1:
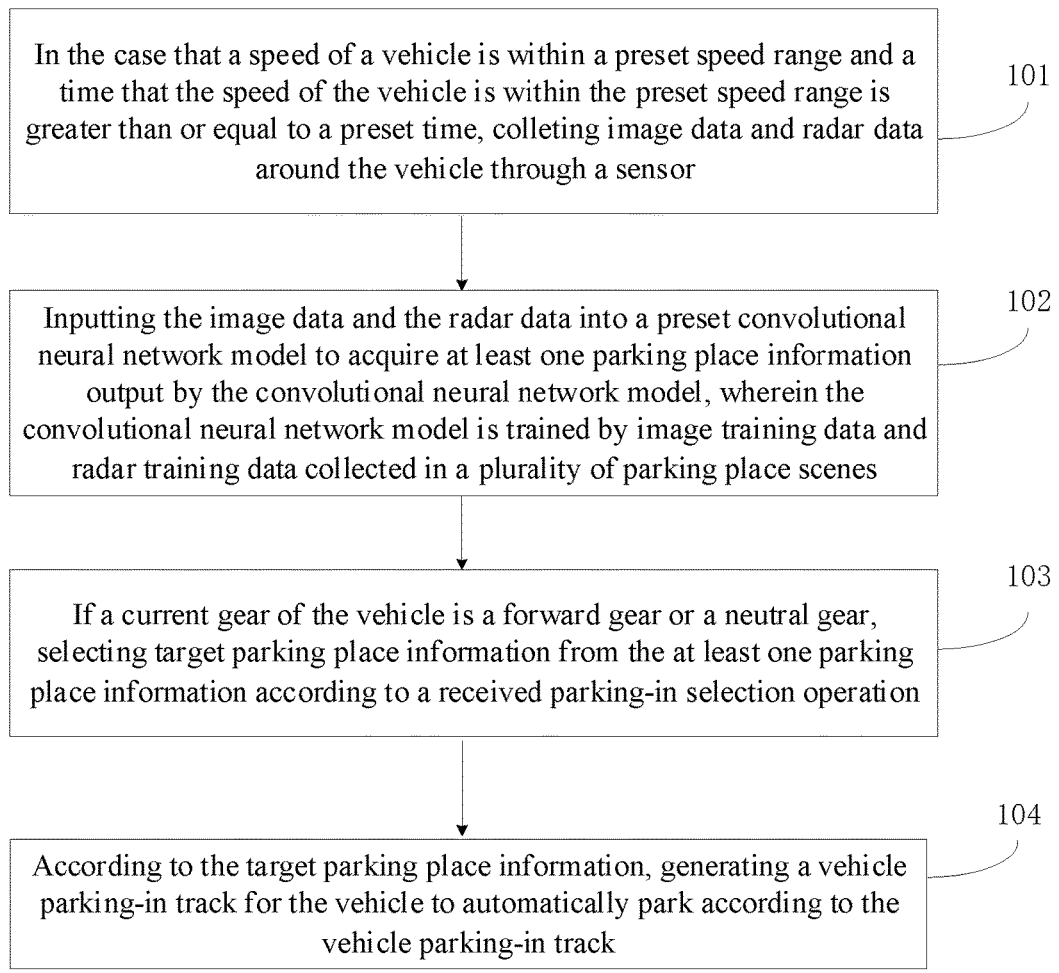
FIG. 1 is a flow chart of steps of an automatic parking control method according to an embodiment of the present disclosure.

Referring to FIG. 1, which illustrates a flow chart of steps of an automatic parking control method according to an embodiment of the present disclosure.

Step 101: when a speed of the vehicle is in a preset speed range and time that the speed of the vehicle is in the preset speed range is greater than or equal to a preset time, collecting image data and radar data around the vehicle through a sensor.

A modern vehicle is provided with a plurality of electronic systems. Various electronic systems may provide rich functions and experience for the vehicle, and the various electronic systems are connected with each other, so that the vehicle may be developed towards automation.

Figure 2:
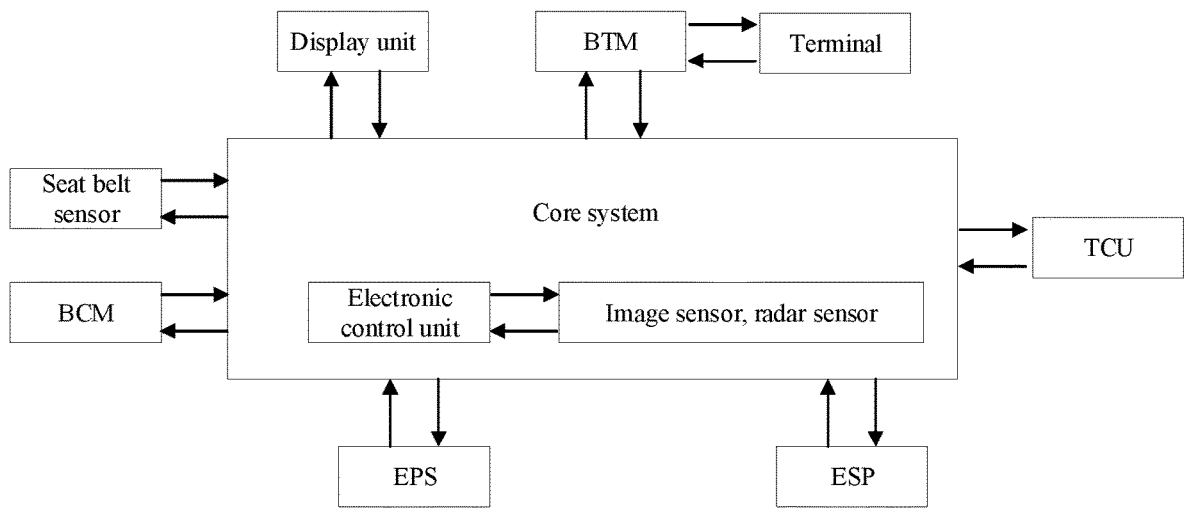
FIG. 2 is a basic architecture diagram of an automatic parking system of an automatic parking vehicle according to an embodiment of the present disclosure.

In the embodiments of the present disclosure, the vehicle is provided with a plurality of electronic systems and a plurality of sensors. The plurality of electronic systems and the plurality of sensors constitute a basic architecture of an automatic parking system of the vehicle together. Referring to FIG. 2, which illustrates a basic architecture diagram of an automatic parking system of an automatic parking vehicle according to an embodiment of the present disclosure. FIG. 2 includes:

a plurality of radar sensors configured for collecting radar data around the vehicle;

a plurality of image sensors configured for collecting image data around the vehicle;

a plurality of seat belt sensors configured for collecting a usage state of a seat belt;

a display unit configured for displaying vehicle information and receiving a user operation, including an on-vehicle screen and a central displaying screen, and the like;

an Electronic Stability Program (ESP) configured for controlling the stability of a vehicle body, performing a braking function or torque output function, and capable of interacting with an Engine Control Module (ECM) or a Vehicle Control Unit (VCU);

an Electric Power Steering (EPS) configured for rotating a steering wheel and feeding back angle information of the steering wheel;

a Transmission Control Unit (TCU) configured for feeding back information of a current gear and switching a target gear;

a Body Control Module (BCM) configured for feeding back a door state and controlling a door lock;

a Balise Transmission Module (BTM) configured for receiving and sending information with a terminal;

a terminal, including an electronic key, a mobile terminal or other electronic devices networked with the vehicle; and an Electronic Control Unit (ECU) configured for receiving the data collected by sensors and processing the data, and further configured for processing and feeding back an input and an output of each electronic system.

In this step, ESP may monitor the speed of the vehicle in real time. When the speed of the vehicle is in the preset speed range and the time that the speed of the vehicle is in the preset speed range is greater than or equal to the preset time, the vehicle may collect the image data around the vehicle through the image sensor and collect the radar data around the vehicle through the radar sensor.

Specifically, when the vehicle is ready to park, the speed of the vehicle is usually kept in a relatively low range, for example, the speed of the vehicle is in a range from 0 km/h to 25 km/h. Meanwhile, in order to exclude other situations such as vehicle starting, a time that the current speed of the vehicle is in the preset speed range is also added as a determining condition. For example, when the speed of the vehicle is kept in the range of 0 km/h to 25 km/h, and the speed lasts for over 10 seconds, the electronic control unit may turn on the image sensor and the radar sensor according to vehicle speed data sent by the ESP to collect the image data and the radar data around the vehicle.

For example, when the user drives the vehicle to enter a parking lot to look for a parking slot, the vehicle starts to slow down and the speed of the vehicle is kept in the range of 0 km/h to 25 km/h constantly. When the duration exceeds 10 seconds, the image sensor and the radar sensor start to collect the image data and the radar data around the vehicle and send the image data and the radar data collected to the electronic control unit.

In the embodiment of the present disclosure, the vehicle may actively collect the image data and the radar data around the vehicle by detecting the speed of the vehicle when the speed of the vehicle reaches a preset condition. Before a user enables an automatic parking function, the electronic control unit acquires the image data of the image sensor and the radar data of the radar sensor in advance, so as to carry out subsequent parking slot analysis operation.

Step 102: inputting the image data and the radar data into a preset convolutional neural network model to acquire at least one parking slot information output by the convolutional neural network model, wherein the convolutional neural network model is trained by image training data and radar training data collected in a plurality of parking slot scenes.

In the embodiment of the present disclosure, the convolutional neural network is a feed-forward neural network containing convolution calculation and having a depth structure, and is one of the representative algorithms of deep learning. The convolutional neural network has a good fault-tolerant ability, a parallel processing ability and a self-learning ability, it may deal with problems with complicated environmental information, unclear background knowledge and unclear reasoning rules, and the convolutional neural network allows samples to have large defects and distortions, and has fast an operating speed, a good adaptive performance and a high resolution. Therefore, using the convolutional neural network may identify parking slots in a plurality of parking slot scenes more accurately and quickly.

Various parameters in the convolutional neural network may be preset in advance, for example, a preset hidden layer parameter of the convolutional neural network and a preset output layer parameter of the convolutional neural network may be preset in advance, so that the convolutional neural network model may be constructed. The steps of constructing the convolutional neural network may include: inputting the image training data and the radar training data collected from the plurality of parking slot scenes into a preset hidden layer of the convolutional neural network, and extracting image features and radar features through the preset hidden layer of the convolutional neural network; classifying parking slot information for the image features and the radar features extracted through a preset output layer of the convolutional neural network; and when the classified parking slot information is consistent with the parking slot information corresponding to each image training data and each radar training data, determining that the convolutional neural network is completely trained and the trained convolutional neural network model is obtained.

Further, when the classified parking slot information is inconsistent with the parking slot information corresponding to each image training data and each radar training data, parameters in the preset hidden layer and the preset output layer may be adjusted by a preset adjustment mode until the classified parking slot information is consistent with the parking slot information corresponding to each image training data and each radar training data, then it is determined that the convolutional neural network is completely trained and the trained convolutional neural network model is obtained.

In this step, a trained convolutional neural network model is preset in the electronic control unit. When the electronic control unit receives the image data and the radar data, the image data and the radar data may be input into the preset convolutional neural network model, and then the convolutional neural network model outputs the parking slot information.

Further, the parking slot information may be divided into valid parking slot information and invalid parking slot information. The valid parking slot information is parking slot information corresponding to a parking slot that may be parked in. After the convolutional neural network model outputs the valid parking slot information, the electronic control unit may store the valid parking slot information as the local parking slot information in the electronic control unit. The invalid parking slot information is parking slot information corresponding to a parking slot that may not be parked in. After the convolutional neural network model outputs the invalid parking slot information, the electronic control unit may delete the invalid parking slot information.

For example, when the user drives the vehicle to park in the parking lot, the sensor sends the image data and the radar data of the plurality of parking slots collected to the electronic control unit during the driving of the vehicle. In the plurality of parking slots, some parking slots have parking locks, some parking slots are parked by vehicles, and some parking slots are available and may be parked in. The electronic control unit may input the image data and the radar data into the preset convolutional neural network model, and then the convolutional neural network model outputs the parking slot information. The parking slots with the parking locks and parked by vehicles correspond to the invalid parking slot information, and the vacant parking slots in the parking slots correspond to the valid parking slot information. Then, the electronic control unit stores the valid parking slot information and deletes the invalid parking slot information.

Preferably, the electronic control unit may store a plurality of parking slot information. Meanwhile, the electronic control unit may also determine a distance of the stored parking slot information. When the electronic control unit detects that an actual distance between the vehicle and the stored parking slot information exceeds a preset distance, the corresponding parking slot information may be deleted, thus avoiding the electronic control unit from storing too much data, and meanwhile, avoiding providing users with parking slot information with a long distance to affect the driving experience of the user.

In the embodiment of the present disclosure, the electronic control unit may output the parking slot information by the preset convolutional neural network model according to the image data and the radar data input. By the processing of the convolutional neural network model, the electronic control unit may process the image data and the radar data in complicated situations, so as to accurately identify the actual parking slot and improve the driving experience of the user.

Step 103: when a current gear of the vehicle is a forward gear or a neutral gear, selecting target parking slot information from the at least one parking slot information according to a received parking-in selection operation.

In this step, the TCU may detect a current gear state of the vehicle and feedback current gear information of the vehicle to the electronic control unit. When the current gear of the vehicle is the forward gear or a neutral gear or the neutral gear, the electronic control unit may select the target parking slot information from the at least one parking slot information according to the received parking-in selection operation.

Figure 3:
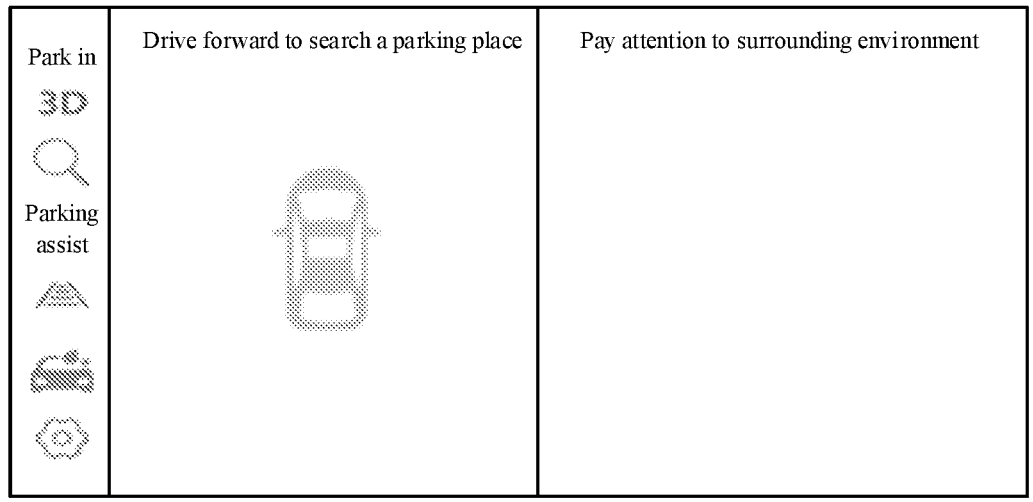
FIG. 3 is an interface diagram of searching parking slots of a vehicle parking-in interface according to the embodiment of the present disclosure.

Specifically, the user may turn on an automatic parking interface of the vehicle when preparing for automatic parking. The electronic control unit may acquire the current gear of the vehicle through the TCU. When the current gear of the vehicle is the forward gear or the neutral gear, the automatic parking interface is jumped to a vehicle parking-in interface. When the electronic control unit stores parking slot information before the display unit displays the vehicle parking-in interface, the vehicle parking-in interface displays the parking slot information. When the electronic control unit does not store parking slot information before the display unit displays the vehicle parking-in interface, the vehicle parking-in interface prompts the user to continue driving the vehicle, and constantly collects the image data and the radar data around the vehicle through the sensors until the electronic control unit stores the parking slot information, and then, the vehicle parking-in interface displays the parking slot information. Referring to FIG. 3, which illustrates an interface diagram of searching parking slots of the vehicle parking-in interface according to the embodiment of the present disclosure.

Further, the vehicle parking-in interface may display a plurality of parking slot information at the same time, and the user may select one parking slot information according to actual requirements thereof. After the user selects the parking slot to park in, that is, after the user selects the parking-in selection operation, the electronic control unit may select the target parking slot information according to the parking-in selection operation of the user.

Figure 4:
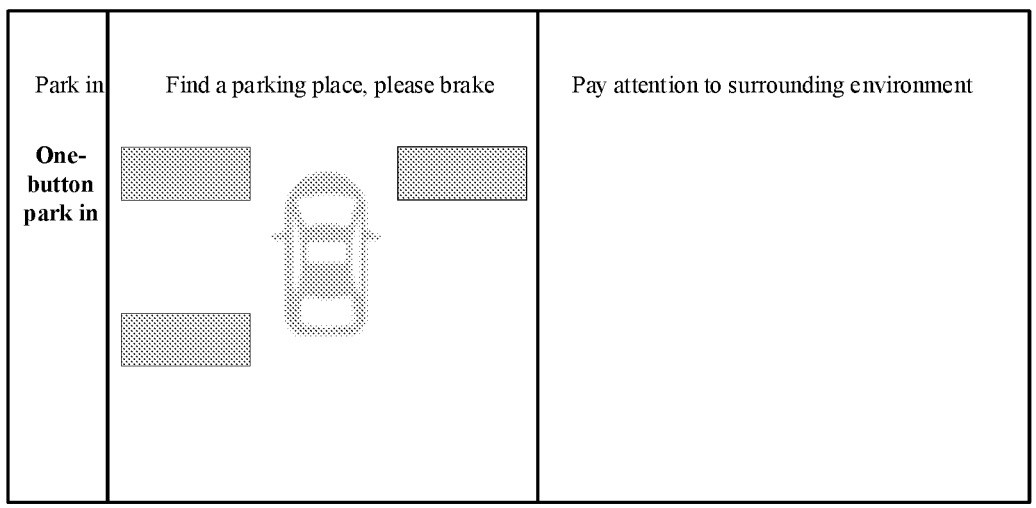
FIG. 4 is an interface diagram of displayed parking slots of the vehicle parking-in interface according to the embodiment of the present disclosure.

For example, Referring to FIG. 4, which illustrates an interface diagram of displayed parking slots of the vehicle parking-in interface according to the embodiment of the present disclosure. FIG. 4 shows that when the vehicle searches that there are three parking slots available for parking nearby, the three parking slots available for parking are displayed on a screen of the vehicle for the user to select. The three parking slots available for parking are a parking slot A, a parking slot B and a parking slot C.

In the embodiment of the present disclosure, the electronic control unit may store a plurality of parking slot information, displays the plurality of parking slot information to the user when the current gear of the vehicle is the forward gear or the neutral gear, select the target parking slot information from the at least one parking slot information according to the parking selection operation of the user, and provide the plurality of parking slots for the user to select when the user requirements to actively select parking positions according to actual requirements, thus achieving the effect of improving the driving experience of the user.

Step 104: according to the target parking slot information, generating a vehicle parking-in track for the vehicle to automatically park according to the vehicle parking-in track.

In this step, the electronic control unit may generate the vehicle parking-in track according to the target parking slot information, and control steering, shifting, braking and parking actions of the vehicle together with the ESP, the EPS and the TCU according to the vehicle parking-in track, so as to control the vehicle to automatically park in the target parking slot.

Specifically, the target parking slot information may include position information of the parking slot, and the electronic control unit may calculate a relative distance between the vehicle and the parking slot by comparing an actual position of the vehicle with the position information of the parking slot, and establish a corresponding coordinate system. In the coordinate system, the electronic control unit may calculate the vehicle parking-in track by defining a coordinate position of the vehicle, a turning radius and an included angle between the vehicle and the parking slot. When the vehicle starts automatic parking, the ESP may constantly control the speed and brake of the vehicle according to an instruction sent by the electronic control unit, the EPS may constantly control the steering of the vehicle according to the instruction sent by the electronic control unit, and the TCU may constantly control the gear of the vehicle according to the instruction sent by the electronic control unit until the vehicle is completely parked in the target parking slot to complete the automatic parking process.

In conclusion, the automatic parking control method provided by the embodiment of the present disclosure includes: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identified by the convolutional neural network model; and further, various parking requirements of a user may be met by providing a plurality of parking slots for parking, thereby perfecting an automatic parking system, and improving the driving experience of the user.

Figure 5:
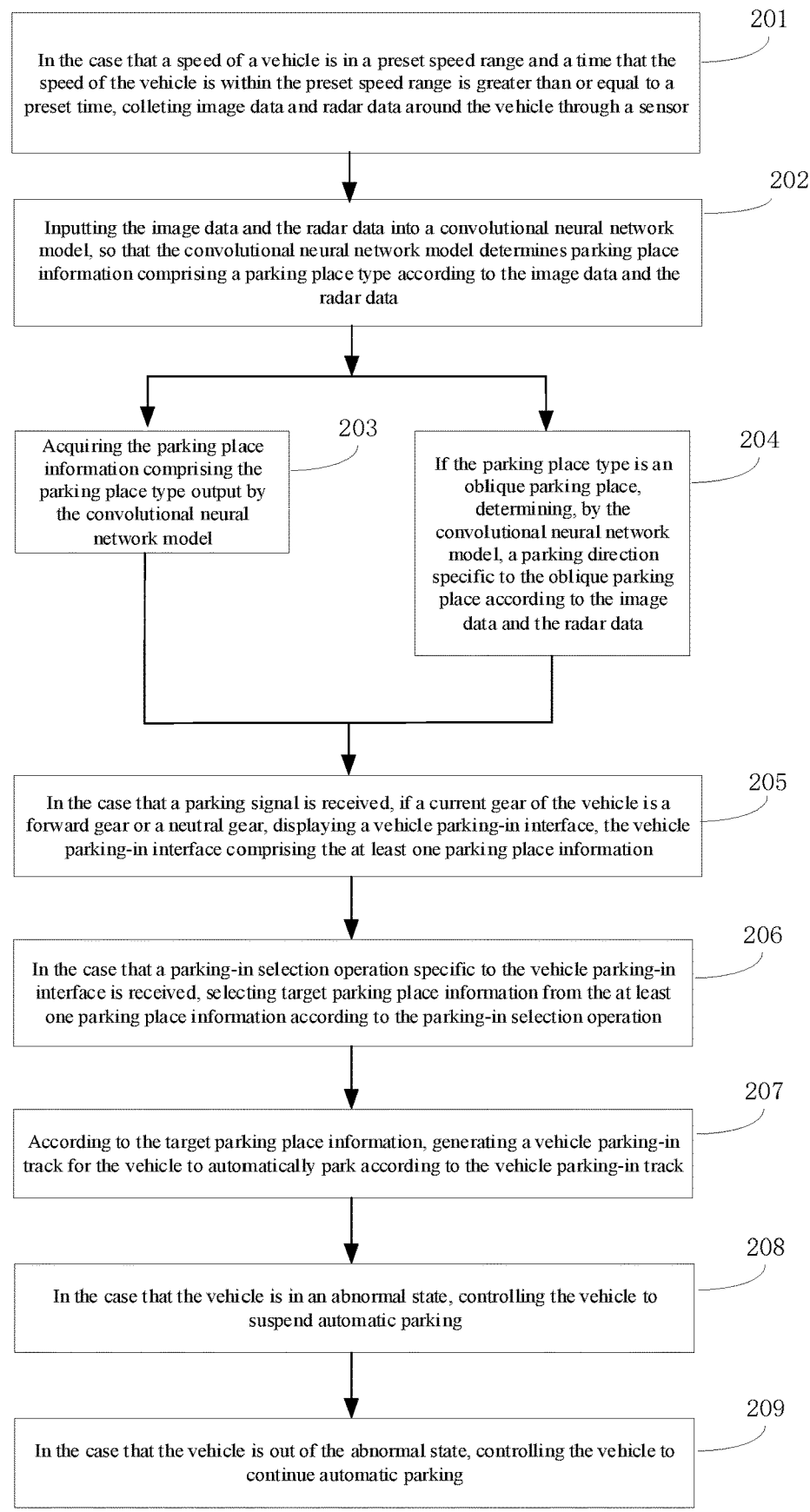
FIG. 5 is a flow chart of steps of another automatic parking control method according to an embodiment of the present disclosure.

Referring to FIG. 5, which illustrates a flow chart of steps of another automatic parking control method according to an embodiment of the present disclosure.

Step 201: when a speed of a vehicle is in a preset speed range and a time that the speed of the vehicle is in the preset speed range is greater than or equal to a preset time, collecting image data and radar data around the vehicle through a sensor.

This step may specifically refer to the above step 101, which will not be repeated here.

Step 202: inputting the image data and the radar data into a convolutional neural network model, so that the convolutional neural network model determines parking slot information including a parking slot type according to the image data and the radar data.

In the embodiment of the present disclosure, the electronic control unit is preset with the convolutional neural network model. The convolutional neural network model is obtained by inputting image training data and radar training data collected a plurality of parking slot scenes and repeatedly training. The plurality of parking slot scenes include: one or more of a parking slot scene with a traffic cone in the parking slot, a parking slot scene with a no-parking sign in the parking slot, a parking slot scene with a parking lock in the parking slot, a parking slot scene with a tag line in the parking slot and a parking slot scene with an obstacle in the parking slot. Further, the selection of the parking slot scenes may also be changed or increased according to the requirements of the user, which is not limited by the embodiments of the present disclosure.

In this step, when the electronic control unit receives the image data and the radar data, the image data and the radar data may be input into the preset convolutional neural network model.

Further, after receiving the image data and the radar data, the convolutional neural network model may extract image features and radar features through a hidden layer, and classify parking slot information for the image features and the radar features extracted through an output layer.

Figure 6:
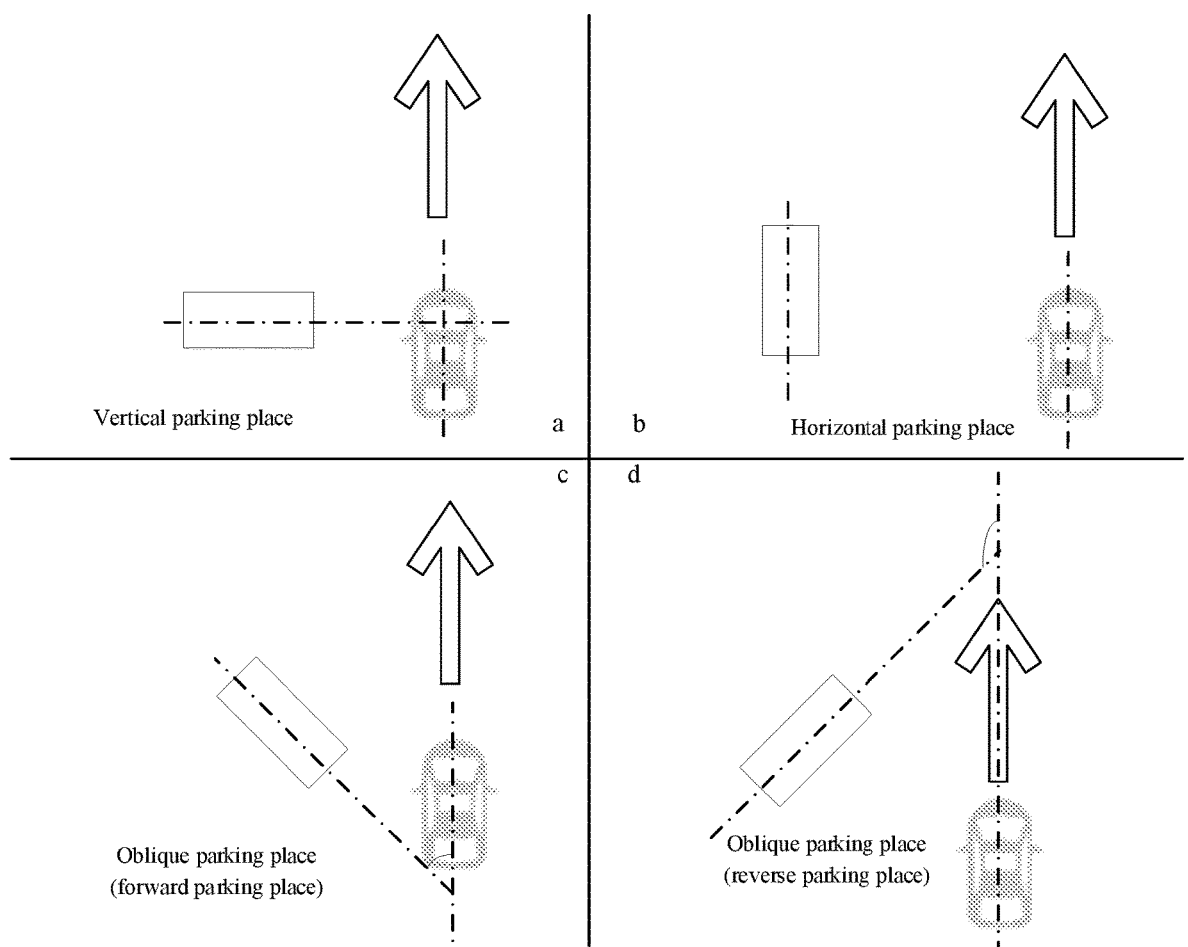
FIG. 6 is a schematic diagram showing classification of three parking slots according to the embodiment of the present disclosure.

The parking slot information may include position information of the parking slot and a parking slot type of the parking slot. Usually, the parking slot type includes a horizontal parking slot, a vertical parking slot and an oblique parking slot. Referring to FIG. 6, which illustrates a schematic diagram showing classification of three parking slots according to the embodiment of the present disclosure. FIG. 6 shows that a parking slot in an area a is a vertical parking slot, a parking slot in an area b is a horizontal parking slot, while parking slots in an area c and an area d are both oblique parking slots. The horizontal parking slot refers to a horizontal position relationship between a longest side of the parking slot and a normal vehicle driving route, the vertical parking slot refers to a vertical position relationship between the longest side of the parking slot and the normal vehicle driving route, and the oblique parking slot refers to a non-horizontal and non-vertical position relationship between the longest side of the parking slot and the normal vehicle driving route.

Step 203: acquiring the parking slot information including the parking slot type output by the convolutional neural network model.

In this step, after the classification of the parking slot information is completed, the convolutional neural network model may output the parking slot information including the parking slot type to the electronic control unit.

Step 204: when the parking slot type is an oblique parking slot, determining, by the convolutional neural network model, a parking direction for the oblique parking slot according to the image data and the radar data.

In step 202, when the parking slot type determined by the convolutional neural network model is an oblique parking slot, step 204 may be directly executed.

In this step, when the parking slot type determined by the convolutional neural network model is an oblique parking slot, the convolutional neural network model may determine the parking direction of the oblique parking slot by further analysis according to the image data and the radar data corresponding to the oblique parking slot.

Specifically, when the vehicle is parked in the oblique parking slot, a parking direction when the front of the vehicle stops at an innermost side of the parking slot is usually called forward parking, and a parking direction when the front of the vehicle stops at an outermost side of the parking slot is called reverse parking.

Further, the oblique parking slot may be divided into a forward parking slot and a reverse parking slot. Referring to FIG. 6, which shows that the parking slot in the area c is a forward parking slot and the parking slot in the area d is a reverse parking slot. The forward parking slot means that an angle between the longest side of the parking slot and an advancing direction in the normal vehicle driving route is less than 90 degrees, while the reverse parking slot means that the angle between the longest side of the parking slot and the advancing direction in the normal vehicle driving route is greater than 90 degrees.

When the oblique parking slot is a forward parking slot, the vehicle may be parked in the parking slot by means of forward parking only with single small-angle steering. However, when the vehicle is parked in the forward parking slot by means of reverse parking, the vehicle may need to steer for many times and at a large angle to complete the parking. Therefore, accurately judging the parking direction of the oblique parking slot may reduce the workload of automatic parking route planning in the later period and reduce the error rate.

Further, when the parking slot type output by the convolutional neural network model is an oblique parking slot, the convolutional neural network model may make further analysis according to the image data and the radar data corresponding to the oblique parking slot. When determining the parking direction of the oblique parking slot, the convolutional neural network model mainly adopts three-grade determining conditions.

Specifically, the first-grade determining condition is that the convolutional neural network model may give priority to judging whether a parking direction sign is drawn in the oblique parking slot, and when the parking direction sign is drawn in the oblique parking slot, the parking direction is determined according to the parking direction sign; the second-grade determining condition is that, when no parking direction sign is drawn in the oblique parking slot, the convolutional neural network model may determine whether other vehicles are parked on both sides of the oblique parking slot, and when other vehicles are parked on both sides of the oblique parking slot and parking directions of other vehicles are consistent, the parking direction of the vehicle is determined according to the parking directions of other vehicles; and the third-grade determining condition is that, when no other vehicles are parked on both sides of the oblique parking slot or other vehicles are parked on both sides of the oblique parking slot, but the parking directions of other vehicles are inconsistent, the convolutional neural network model may determine whether the oblique parking slot is a forward parking slot, and when the oblique parking slot is a forward parking slot, it is determined that the parking direction is forward parking. When the oblique parking slot is not a forward parking slot, it is determined that the parking direction is reverse parking.

For example, when the vehicle is ready to park in a parking lot, the convolutional neural network model determines that a certain parking slot is an oblique parking slot according to image data and radar data. Then, the convolutional neural network model may classify a parking direction of the parking slot. First of all, when no parking direction sign is drawn in the oblique parking slot, and vehicles are parked on both sides of the oblique parking slot, and meanwhile, parking directions of the vehicles on both sides are consistent, the second-grade determining condition is adopted. Further, when the parking directions of the vehicles on both sides of the oblique parking slot are both forward parking, then the convolutional neural network model may determine that the parking direction of the oblique parking slot is forward parking.

In the embodiment of the present disclosure, when the parking slot type is an oblique parking slot, the parking direction of the oblique parking slot may be determined by the convolutional neural network model, so that the automatic parking function is more consistent with an actual driving behavior to reduce the workload for automatic parking route planning in the later period, reduce the error rate, and improve the driving experience of the user.

The acquired parking slot information output by the convolutional neural network model further includes the parking direction of the oblique parking slot.

In this step, after the classification of the parking slot information is completed, the convolutional neural network model may output the parking slot information including the parking direction to the electronic control unit.

Step 205: when a parking signal is received, when a current gear of the vehicle is a forward gear or a neutral gear, displaying a vehicle parking-in interface, the vehicle parking-in interface including the at least one parking slot information.

In this step, the user may open an automatic parking interface of the vehicle when preparing for automatic parking, that is, the user sends out parking information. When the parking signal is received, the electronic control unit may acquire the current gear of the vehicle by a TCU. When the current gear of the vehicle is the forward gear or the neutral gear, then the automatic parking interface is jumped to the vehicle parking-in interface. When the electronic control unit stores parking slot information before a display unit displays the vehicle parking-in interface, the vehicle parking-in interface displays the parking slot information. When the electronic control unit does not store the parking slot information before the display unit displays the vehicle parking-in interface, the vehicle parking-in interface prompts the user to continue driving the vehicle, and constantly collects image data and radar data around the vehicle through the sensor until the electronic control unit stores the parking slot information, and the vehicle parking-in interface displays the parking slot information.

Specifically, the vehicle parking-in interface may display a plurality of parking slot information at the same time, and the user may select one parking slot information according to actual requirements thereof.

Step 206: when a parking-in selection operation for the vehicle parking-in interface is received, selecting target parking slot information from the at least one parking slot information according to the parking-in selection operation.

In this step, the user may select one parking slot information according to actual requirements thereof. When the parking-in selection operation specific to the vehicle parking-in interface is received, the electronic control unit may select the target parking slot information from the at least one parking slot information according to the parking-in selection operation.

Figure 7:
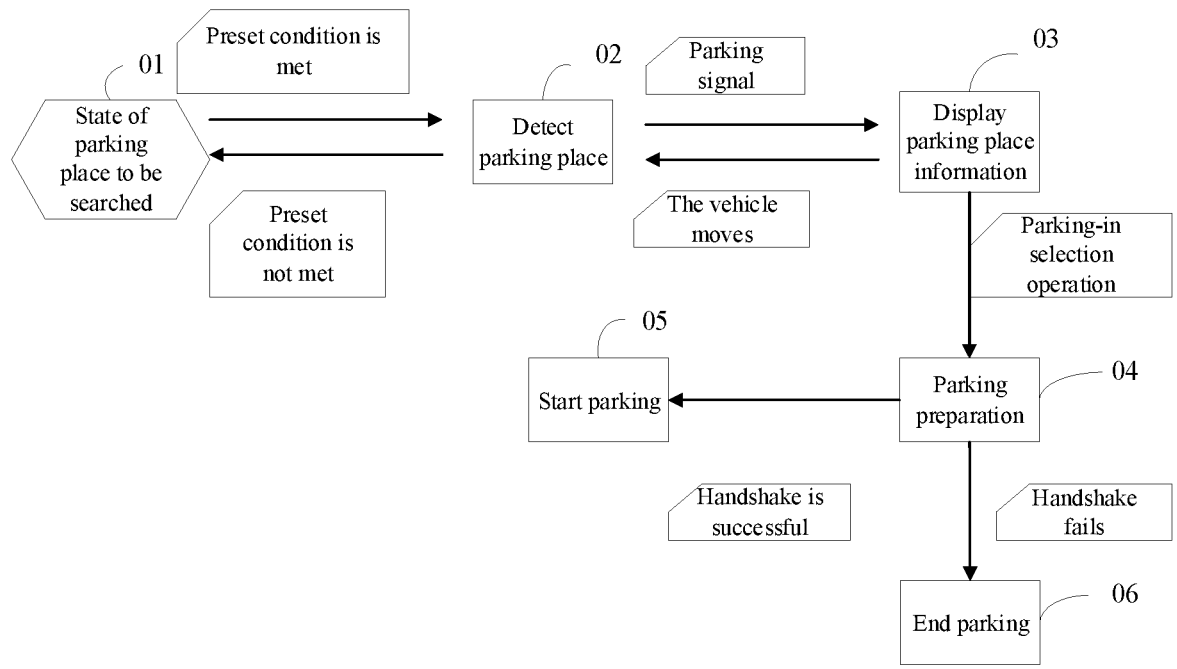
FIG. 7 is a flow chart of an automatic parking process according to the embodiment of the present disclosure.

Specifically, referring to FIG. 7, which illustrates a flow chart of an automatic parking process according to the embodiment of the present disclosure. Referring to FIG. 7, after the vehicle is started, an automatic parking system enters 01 "state of parking slot to be searched". When the speed of the vehicle meets a preset condition for searching parking slots, the vehicle starts to collect image data and radar data, and performs 02 "parking slot detection". When the speed of the vehicle does not satisfy the preset condition for searching parking slots, the automatic parking system enters 01 "state of parking slot to be searched" again. When the parking signal is received, and the current gear of the vehicle is the forward gear or the neutral gear, the vehicle performs 03 "parking slot information display" and waits for receiving the parking-in selection operation of the user. When the vehicle moves again, the automatic parking system may detect parking slots again. After receiving the parking-in selection operation of the user, the vehicle enters 04 "parking preparation stage", and the electronic control unit shakes hands with each system. When the handshake is successful, 05 "start parking" is performed. When the handshake fails, 06 "end parking" is performed.

Preferably, in order to avoid parking the vehicle in a wrong parking slot due to mis-operation of the user, when the user selects the target parking slot information, the vehicle may accept the parking-in selection operation of the user only when the user presses the brake at the same time, so as to ensure that the user correctly selects the target parking slot information.

Step 207: according to the target parking slot information, generating a vehicle parking-in track for the vehicle to automatically park according to the vehicle parking-in track.

For the step, reference may be specifically made to the step 104 above, and details are not described herein again.

Step 208: when the vehicle is in an abnormal state, controlling the vehicle to suspend automatic parking.

In this step, the electronic control unit may detect the state of the vehicle by the sensor. When the vehicle is in the abnormal state, the sensor may send detection information to the electronic control unit. The electronic control unit may determine whether the vehicle is in the abnormal state according to the detection information, and control the vehicle to stop automatic parking when the vehicle is determined to be in the abnormal state. The abnormal state includes: a seat belt of a driver seat being unfastened, a door of the vehicle being unclosed, and an obstacle appearing in the vehicle parking-in track.

Specifically, a seat belt sensor in the vehicle may detect whether the seat belt of the driver seat is fastened. When the seat belt sensor detects that the seat belt of the driver seat is unfastened when the vehicle is in automatic parking, the seat belt sensor may send detection information to the electronic control unit, and the electronic control unit may suspend the automatic parking process of the vehicle according to the detection information of the seat belt sensor.

Specifically, a body control module in the vehicle may detect whether the door of the vehicle is closed. When the body control module detects that the door of the vehicle is unclosed when the vehicle is in automatic parking, the body control module may send detection information to the electronic control unit, and the electronic control unit may suspend the automatic parking process of the vehicle according to the detection information of the body control module.

Specifically, a radar sensor in the vehicle may detect whether an obstacle appears in the vehicle parking-in track. When the radar sensor detects that the obstacle appears in the vehicle parking-in track when the vehicle is in automatic parking, the radar sensor may send detection information to the electronic control unit, and the electronic control unit may suspend the automatic parking process of the vehicle according to the detection information of the radar sensor.

Further, the abnormal state may further include other abnormal states of the vehicle, for example, a seat sensor is added in the driver seat of the vehicle. The seat sensor may detect a pressure value of the seat, and when the user in the driver seat gets up and leaves the seat, the seat sensor may send detection information to the electronic control unit. This will not be limited in the embodiment of the present disclosure.

Preferably, when the time of the vehicle being in the abnormal state exceeds the preset interruption time, the electronic control unit may actively quit the automatic parking system, so that the user may have enough time to troubleshoot and restart the vehicle when it is determined that the vehicle is not in an abnormal state.

Figure 8:
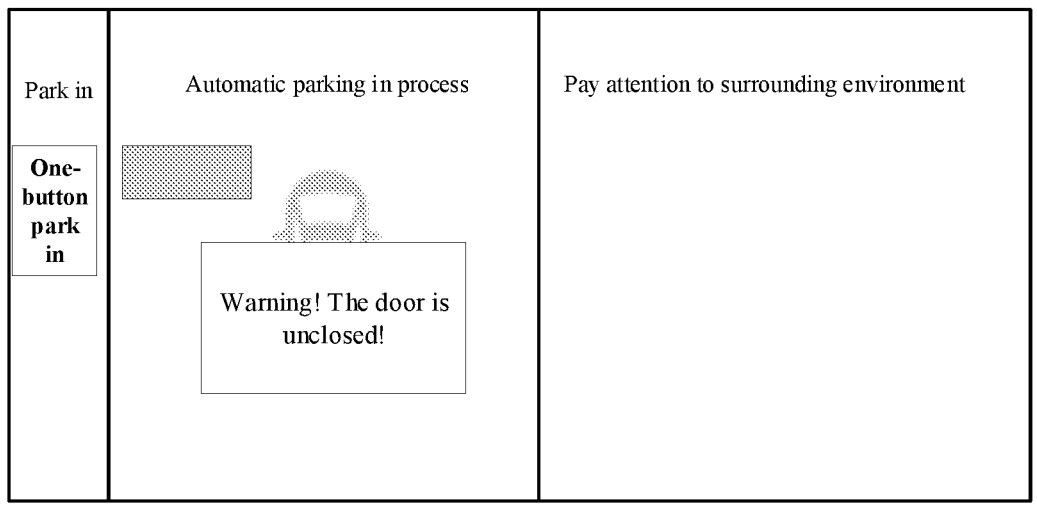
FIG. 8 is a schematic diagram showing vehicle abnormal state information according to the embodiment of the present disclosure.

For example, when the vehicle is automatically parked in a parking lot, a certain user in the vehicle actively opens the door of the vehicle, then the body control module may detect that the door of the vehicle is unclosed and send detection information to the electronic control unit. The electronic control unit may determine that the vehicle is in the abnormal state according to the detection information, control the vehicle to suspend automatic parking, and display a prompt message to the user to inform the user of the abnormal state of the vehicle. Referring to FIG. 8, which shows a schematic diagram of vehicle abnormal state information according to the embodiment of the present disclosure. FIG. 8 shows a prompt message "Warning! The door is unclosed!" appearing in the vehicle parking-in interface."

In the embodiment of the present disclosure, the electronic control unit may detect whether the vehicle is in the abnormal state by the sensor. When the vehicle is in the abnormal state, the electronic control unit may control the vehicle to suspend automatic parking. By detecting the state of the vehicle in real time during the automatic parking process, the automatic parking may be suspended in time when the vehicle is found to be abnormal, which increases the safety of the automatic parking system and improves the driving experience of the user.

Step 209: when the vehicle is out of the abnormal state, controlling the vehicle to continue automatic parking.

In this step, when the user eliminates the abnormal state of the vehicle, the electronic control unit may detect that the vehicle is out of the abnormal state, and send detection information to the electronic control unit. The electronic control unit may determine whether the vehicle is out of the abnormal state according to the detection information, and control the vehicle to continue automatic parking when the vehicle is determined to be out of the abnormal state.

Figure 9:
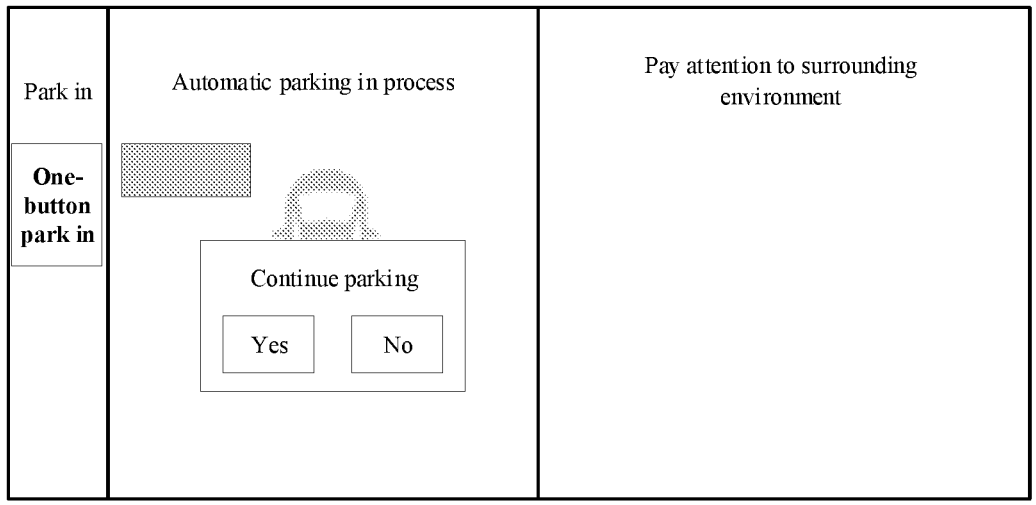
FIG. 9 is a schematic diagram of an option after parking is suspended according to the embodiment of the present disclosure.

Specifically, when the vehicle is out of the abnormal state, the vehicle may also show a choice of whether to continue parking for the user to select whether to continue automatic parking. Referring to FIG. 9, which shows a schematic diagram of an option after parking is suspended according to the embodiment of the present disclosure. With reference to FIG. 9, when the vehicle is out of the abnormal state, the vehicle may prompt the user to "continue parking" in the display screen, and provide two options of "yes" and "no" for the user to determine whether to continue automatic parking according to actual requirements.

Figure 10:
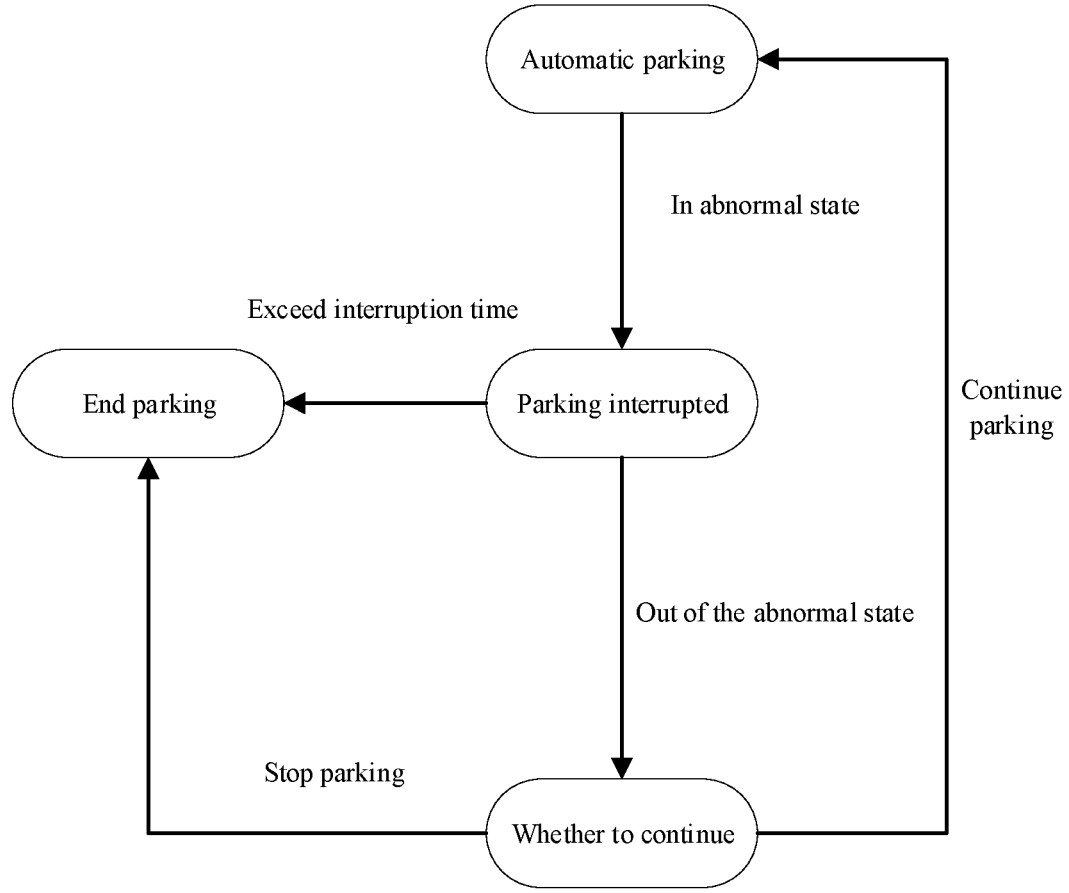
FIG. 10 is a schematic diagram of an automatic parking suspension process according to the embodiment of the present disclosure.

Referring to FIG. 10, which illustrates a schematic diagram of an automatic parking suspension process according to the embodiment of the present disclosure. With reference to FIG. 10, when the vehicle is performing automatic parking, and the vehicle is in the abnormal state, the electronic control unit controls the vehicle to suspend parking. When the time of the vehicle being in the abnormal state longer than the preset interruption time, the electronic control unit may end automatic parking. When the vehicle is out of the abnormal state, the user may select a continue option to continue automatic parking, or the user may select a stop selection to end automatic parking. When the vehicle completely enters the target parking slot, the automatic parking is ended.

In conclusion, the automatic parking control method provided by the embodiment of the present disclosure includes: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identified by the convolutional neural network model; and further, various parking requirements of a user may be met by providing a plurality of parking slots for parking, thereby perfecting an automatic parking system, and improving the driving experience of the user.

Moreover, in the present disclosure, when the parking slot type is an oblique parking slot, the parking direction of the oblique parking slot may also be determined by the convolutional neural network model, so that the automatic parking function is more consistent with an actual driving behavior to reduce the workload for automatic parking route planning in the later period, reduce the error rate, and further improve the driving experience of the user.

Figure 11:
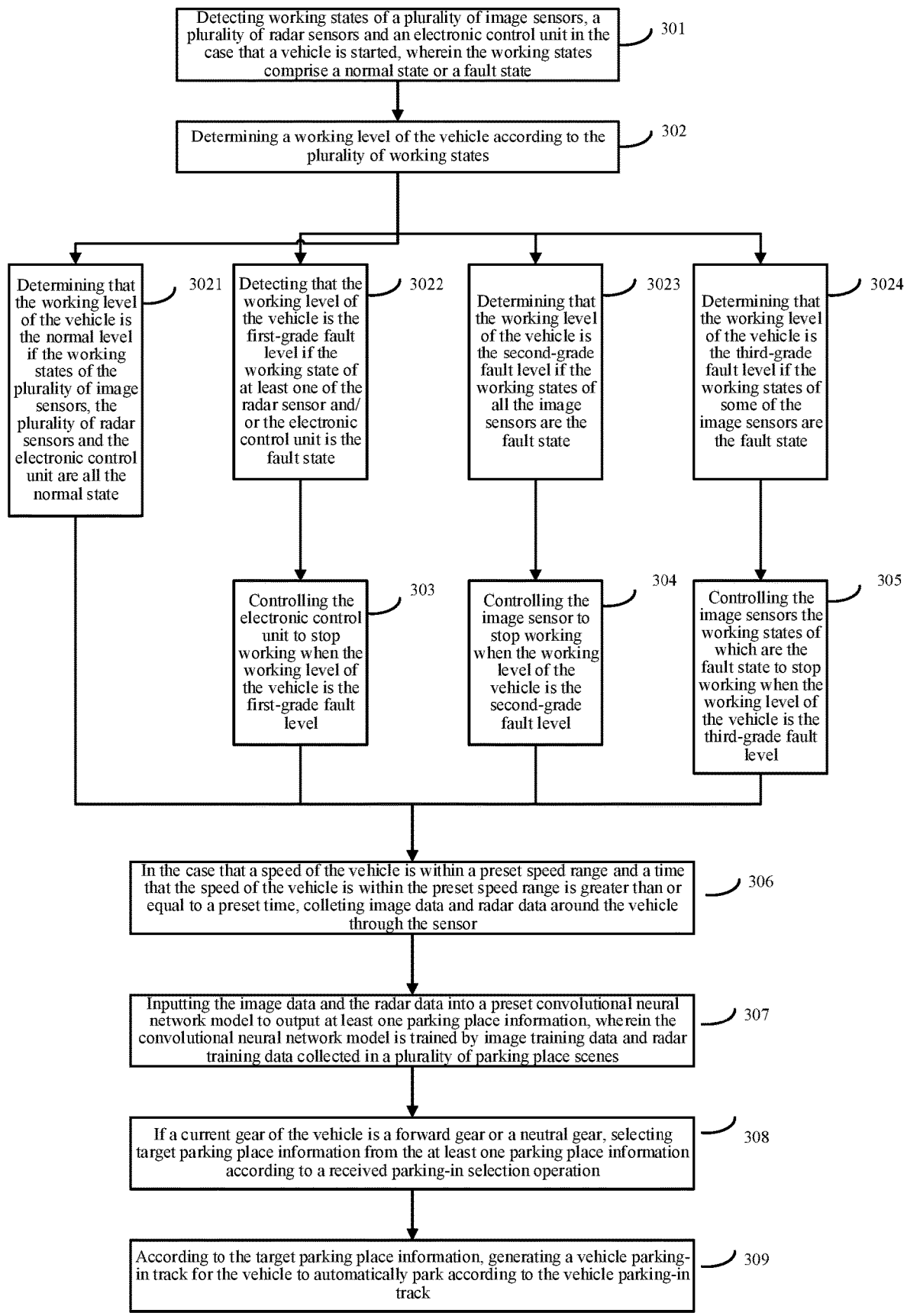
FIG. 11 is a flow chart of steps of another automatic parking control method according to an embodiment of the present disclosure.

Referring to FIG. 11, which illustrates a flow chart of steps of another automatic parking control method according to an embodiment of the present disclosure.

Step 301: detecting working states of a plurality of image sensors, a plurality of radar sensors and an electronic control unit when a vehicle is started, wherein the working states include a normal state or a fault state.

In this step, when the vehicle is started, an automatic parking system is started together with the vehicle. After the automatic parking system is started, the electronic control unit starts to detect the working states of the plurality of image sensors and the plurality of radar sensors and the working state of the electronic control unit itself, wherein the working states include the normal state or the fault state.

Specifically, in real life, an electronic system of the vehicle is a huge and complicated system, especially the sensors on the outside of the vehicle body are easily damaged and affect the use of various functions of the vehicle. Therefore, in the embodiment of the present disclosure, after the automatic parking system is started, the electronic control unit may detect the working states of the plurality of image sensors and the plurality of radar sensors and the working state of the electronic control unit itself.

Preferably, the electronic control unit may also detect working states of other sensors and electronic systems, and this is not limited in the embodiment of the present disclosure.

Step 302: determining a working level of the vehicle according to the plurality of working states.

In this step, the electronic control unit may determine the working level of the automatic parking system in the vehicle according to the working states of different sensors.

Specifically, this step may also be divided into the following three sub-steps.

Step 3021: determining that the working level of the vehicle is the normal level when the working states of the plurality of image sensors, the plurality of radar sensors and the electronic control unit are all the normal state.

In this step, the working level of the vehicle is determined to be the normal level when the working states of the plurality of image sensors, the plurality of radar sensors and the electronic control unit are all the normal state. In the normal working level, the automatic parking system may start the plurality of image sensors, the plurality of radar sensors and the electronic control unit to work normally.

Step 3022: detecting that the working level of the vehicle is the first-grade fault level when the working state of at least one of the radar sensors and/or the electronic control unit is the fault state.

In this step, the working level of the vehicle is determined to be the first-grade fault level when the working state of at least one of the radar sensors and/or the electronic control unit is the fault state.

Step 3023: determining that the working level of the vehicle is the second-grade fault level when the working states of all the image sensors are the fault state.

In this step, the working level of the vehicle is determined to be the second-grade fault level when the working states of all the image sensors are the fault state.

Step 3024: determining that the working level of the vehicle is the third-grade fault level when the working states of some of the image sensors are the fault state.

In this step, the working level of the vehicle is determined to be the third-grade fault level when the working states of some of the image sensors are the fault state.

After step 3022, step 303 is executed.

Step 303: controlling the electronic control unit to stop working when the working level of the vehicle is the first-grade fault level.

In this step, when the working level of the vehicle is the first-grade fault level, a part of the electronic control unit corresponding to the automatic parking system may stop working, such that the user may not use the automatic parking system.

After step 3023, step 304 is executed.

Step 304: controlling the image sensor to stop working when the working level of the vehicle is the second-grade fault level.

In this step, when the working level of the vehicle is the second-grade fault level, the automatic parking system may prohibit all the image sensors from starting, and only start the radar sensors and the electronic control unit.

Specifically, as the image sensors are prohibited to start, the convolutional neural network model of the electronic control unit may not be used. When the vehicle determines the parking slot information, the electronic control unit may build a virtual map with the vehicle as a center through the radar data of the radar sensor, and constantly improve the virtual map through the radar data, and then acquire the parking slot information after the virtual map is perfected.

After step 3024, step 305 is executed.

Step 305: controlling the image sensors the working states of which are the fault state to stop working when the working level of the vehicle is the third-grade fault level.

In this step, when the working level of the vehicle is the third-grade fault level, the automatic parking system may prohibit the image sensors the working states of which are the fault state from starting, and only start the image sensors in the normal state. In this case, the convolutional neural network model of the electronic control unit may be used in normal, but the accuracy may be reduced.

Step 306: when a speed of the vehicle is in a preset speed range and time that the speed of the vehicle is in the preset speed range is greater than or equal to preset time, collecting image data and radar data around the vehicle through the sensor.

For the step, reference may be specifically made to the step 101 above, and details are not described herein again.

Step 307: inputting the image data and the radar data into a preset convolutional neural network model to output at least one parking slot information, wherein the convolutional neural network model is trained by image training data and radar training data collected in a plurality of parking slot scenes.

For the step, reference may be specifically made to the step 102 above, and details are not described herein again.

Step 308: when a current gear of the vehicle is a forward gear or a neutral gear, selecting target parking slot information from the at least one parking slot information according to a received parking-in selection operation.

For the step, reference may be specifically made to the step 103 above, and details are not described herein again.

Step 309: according to the target parking slot information, generating a vehicle parking-in track for the vehicle to automatically park according to the vehicle parking-in track.

For the step, reference may be specifically made to the step 104 above, and details are not described herein again.

In conclusion, the automatic parking control method provided by the embodiment of the present disclosure includes: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identified by the convolutional neural network model; and further, various parking requirements of a user may be met by providing a plurality of parking slots for parking, thereby perfecting an automatic parking system, and improving the driving experience of the user.

In addition, the present disclosure may also set the fault levels of the automatic parking system, detect the working state of the automatic parking system through the electronic control unit, determine the fault levels, and enable different functions in the automatic parking system according to different fault levels, thus increasing the application range of the automatic parking system, assisting the user to park when some functions fail, and improving the driving experience of the user.

Figure 12:
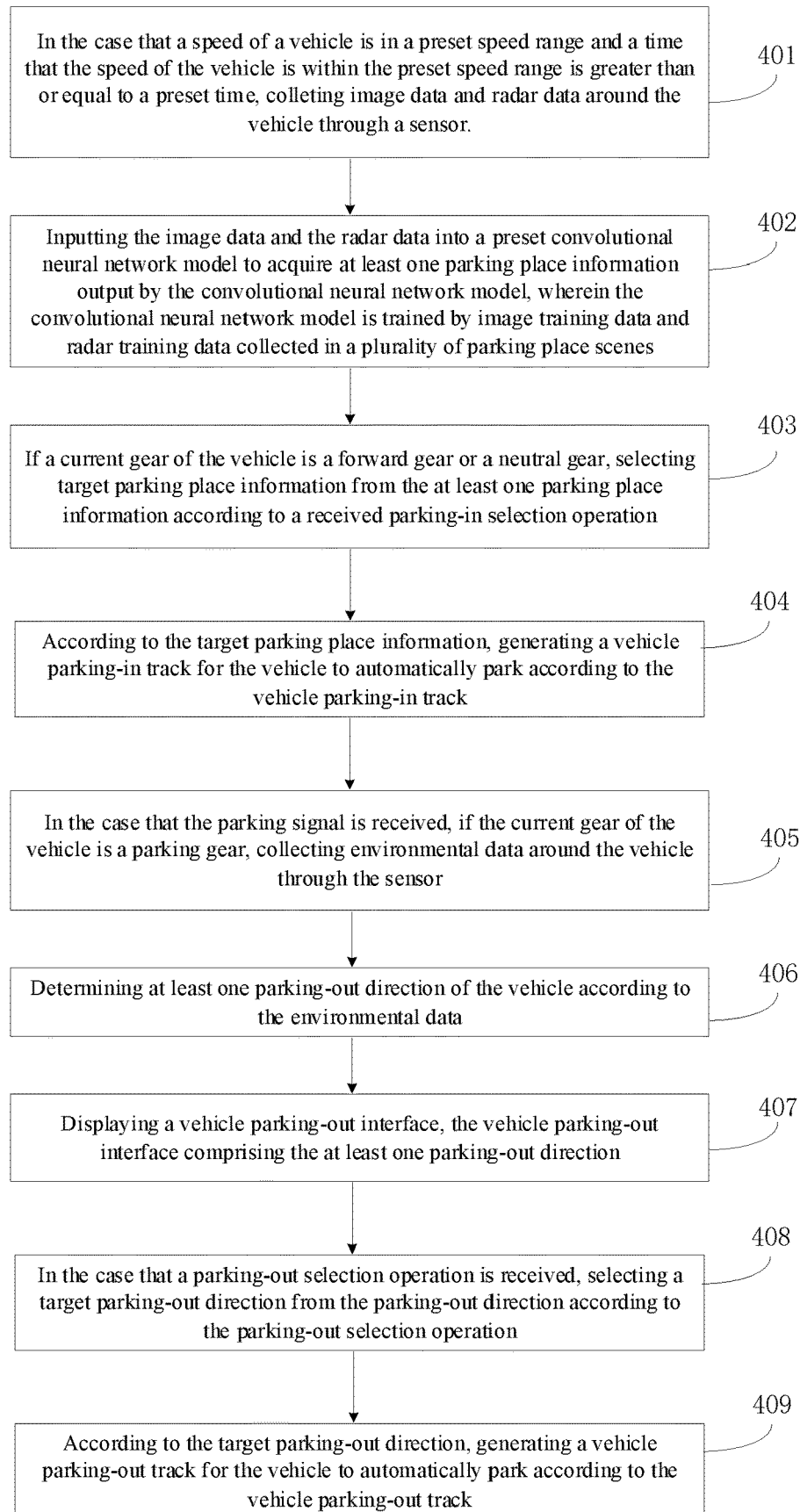
FIG. 12 is a flow chart of steps of another automatic parking control method according to an embodiment of the present disclosure.

Referring to FIG. 12, which illustrates a flow chart of steps of another automatic parking control method according to an embodiment of the present disclosure.

Step 401: when a speed of a vehicle is in a preset speed range and time that the speed of the vehicle is in the preset speed range is greater than or equal to preset time, collecting image data and radar data around the vehicle through a sensor.

For the step, reference may be specifically made to the step 101 above, and details are not described herein again.

Step 402: inputting the image data and the radar data into a preset convolutional neural network model to acquire at least one parking slot information output by the convolutional neural network model, wherein the convolutional neural network model is trained by image training data and radar training data collected in a plurality of parking slot scenes.

For the step, reference may be specifically made to the step 102 above, and details are not described herein again.

Step 403: when a current gear of the vehicle is a forward gear or a neutral gear, selecting target parking slot information from the at least one parking slot information according to a received parking-in selection operation.

For the step, reference may be specifically made to the step 103 above, and details are not described herein again.

Step 404: according to the target parking slot information, generating a vehicle parking-in track for the vehicle to automatically park according to the vehicle parking-in track.

For the step, reference may be specifically made to the step 104 above, and details are not described herein again.

Step 405: when the parking signal is received, when the current gear of the vehicle is a parking gear, collecting environmental data around the vehicle through the sensor.

In this step, the user may open an automatic parking interface of the vehicle when preparing for automatic parking, that is, the user sends out parking information. When the parking signal is received, the electronic control unit may acquire the current gear of the vehicle by a TCU. When the current gear of the vehicle is the parking gear, the radar sensor collects the radar data around the vehicle.

Specifically, in comparison to that the vehicle parks in a parking slot, when the vehicle parks out a parking slot, the parking-out track is simpler, so only the radar data is needed to determine the parking-out direction of the vehicle.

Step 406: determining at least one parking-out direction of the vehicle according to the environmental data.

In this step, the electronic control unit may obtain distance data of surrounding obstacles of the vehicle according to the environmental data, and determine the parking-out direction of the vehicle according to the environmental data.

Specifically, the environmental data may be radar data or image data. When a distance between the obstacles around the vehicle and the vehicle is greater than a preset distance, the vehicle determines to enable an automatic parking-out function. After the automatic parking-out function is enabled, the electronic control unit may build a virtual map around the vehicle according to the radar data, and determine the parking-out direction of the vehicle according to the virtual map. The parking-out direction of the vehicle may include one or more of forward parking-out, rearward parking-out, left parking-out and right parking-out.

For example, when the user prepares to park out the vehicle, a left side of a parking slot where the vehicle is located is a traffic road, a right side of the parking slot is a wall, other vehicles are parked at a rear side of the parking slot, and there are no vehicle in front of the parking slot, then the electronic control unit may build a virtual map around the vehicle according to the radar data, and determine that the parking-out direction of the vehicle are left parking-out and front parking-out according to the virtual map.

Step 407: displaying a vehicle parking-out interface, the vehicle parking-out interface including the at least one parking-out direction.

In this step, after the electronic control unit determines the parking-out direction of the vehicle, the automatic parking interface is jumped to the vehicle parking-out interface, and the vehicle parking-out interface displays the parking-out direction of the vehicle.

Figure 13:
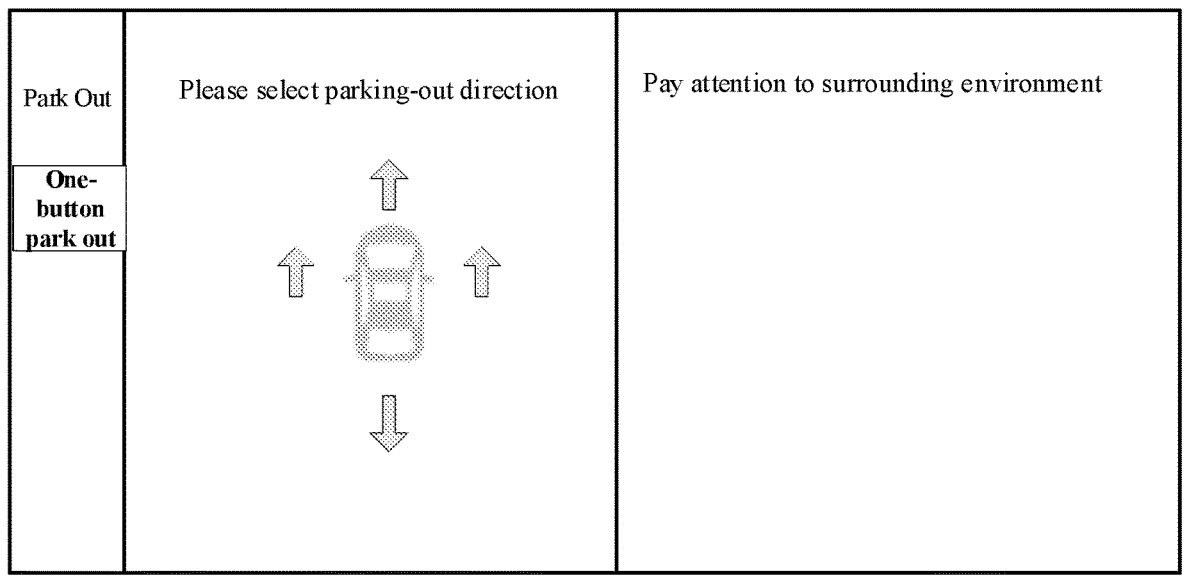
FIG. 13 is a schematic diagram showing parking-out direction selection of an automatic parking system according to an embodiment of the present disclosure.

Specifically, referring to FIG. 12, which illustrates a schematic diagram showing parking-out direction selection of an automatic parking system according to the embodiment of the present disclosure. FIG. 13 shows parking-out directions around a vehicle logo in the vehicle parking-out, and a user may select the parking-out direction needed according to actual requirements.

Step 408: when a parking-out selection operation is received, selecting a target parking-out direction from the parking-out direction according to the parking-out selection operation.

In this step, when the parking-out selection operation of the user is received, the electronic control unit may select the target parking-out direction from the parking-out direction according to the parking-out selection operation.

Step 409: according to the target parking-out direction, generating a vehicle parking-out track for the vehicle to automatically park according to the vehicle parking-out track.

In this step, the electronic control unit may generate the vehicle parking-out track according to the target parking-out direction, and control steering, shifting, braking and parking actions of the vehicle together with an ESP, an EPS and the TCU according to the vehicle parking-out track, so as to control the vehicle to automatically park out the target parking slot.

Specifically, the electronic control unit may compare a target position corresponding to the target parking-out direction with an actual position of the vehicle, calculate a relative distance between the vehicle and the target position, and establish a corresponding coordinate system. In the coordinate system, the electronic control unit may calculate the vehicle parking-out track by defining a coordinate position of the vehicle, a turning radius and an included angle between the vehicle and the target parking slot. When the vehicle starts automatic parking, the ESP may constantly control the speed and brake of the vehicle according to an instruction sent by the electronic control unit, the EPS may constantly control the steering of the vehicle according to the instruction sent by the electronic control unit, and the TCU may constantly control the gear of the vehicle according to the instruction sent by the electronic control unit until the vehicle is completely parked in the target parking slot to complete the automatic parking process.

Preferably, in the automatic parking process of the vehicle, when the electronic control unit determines that the vehicle is in the abnormal state, the automatic parking may also be suspended, and may be continued after the vehicle is out of the abnormal state.

Figure 14:
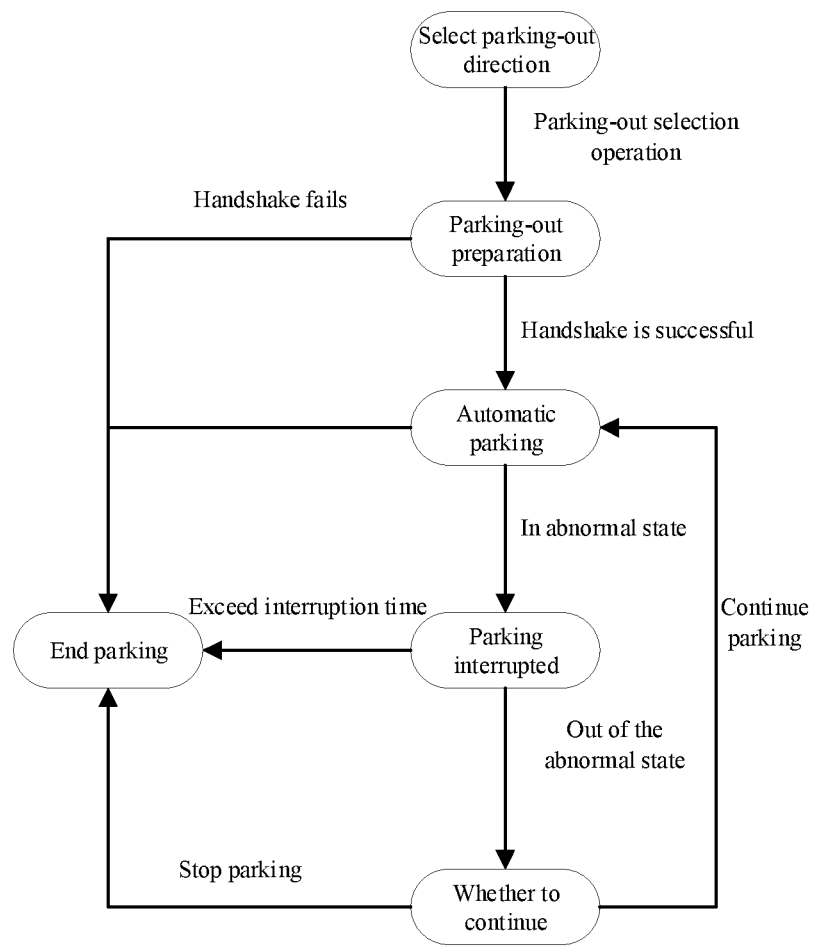
FIG. 14 is a flow chart of steps of another automatic parking process according to an embodiment of the present disclosure.

Referring to FIG. 14, which illustrates a flow chart of another automatic parking process according to the embodiment of the present disclosure. FIG. 14 shows that when the vehicle is waiting for the user to select the parking direction, the electronic control unit may determine to enter a parking-out preparation stage according to the parking-out selection operation of the user. In the parking-out preparation stage, the electronic control unit performs handshake with each system. When the handshake is successful, parking is started; and when the handshake fails, automatic parking is ended. When the electronic control unit successfully performs handshake with each system, the vehicle starts to park out automatically. When the vehicle is in the abnormal state, the electronic control unit controls the vehicle to suspend parking. When the time of the vehicle being in the abnormal state over the preset interruption time, the electronic control unit may end automatic parking. When the vehicle is out of the abnormal state, the user may select a continue option to continue automatic parking, or the user may select a stop selection to end automatic parking. When the vehicle completely enters the target position, the automatic parking is ended.

In conclusion, the automatic parking control method provided by the embodiment of the present disclosure includes: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identified by the convolutional neural network model; and further, various parking requirements of a user may be met by providing a plurality of parking slots for parking, thereby perfecting an automatic parking system, and improving the driving experience of the user.

In addition, in the present disclosure, the automatic parking system also plan the vehicle parking-out track according to the radar data when the user requirements to park out the vehicle, so that the user may park out the parking slot without driving the vehicle himself, thus perfecting the automatic parking system and improving the driving experience of the user.

On the basis of the foregoing embodiments, the embodiments of the present disclosure further provide an automatic parking control apparatus.

Figure 15:
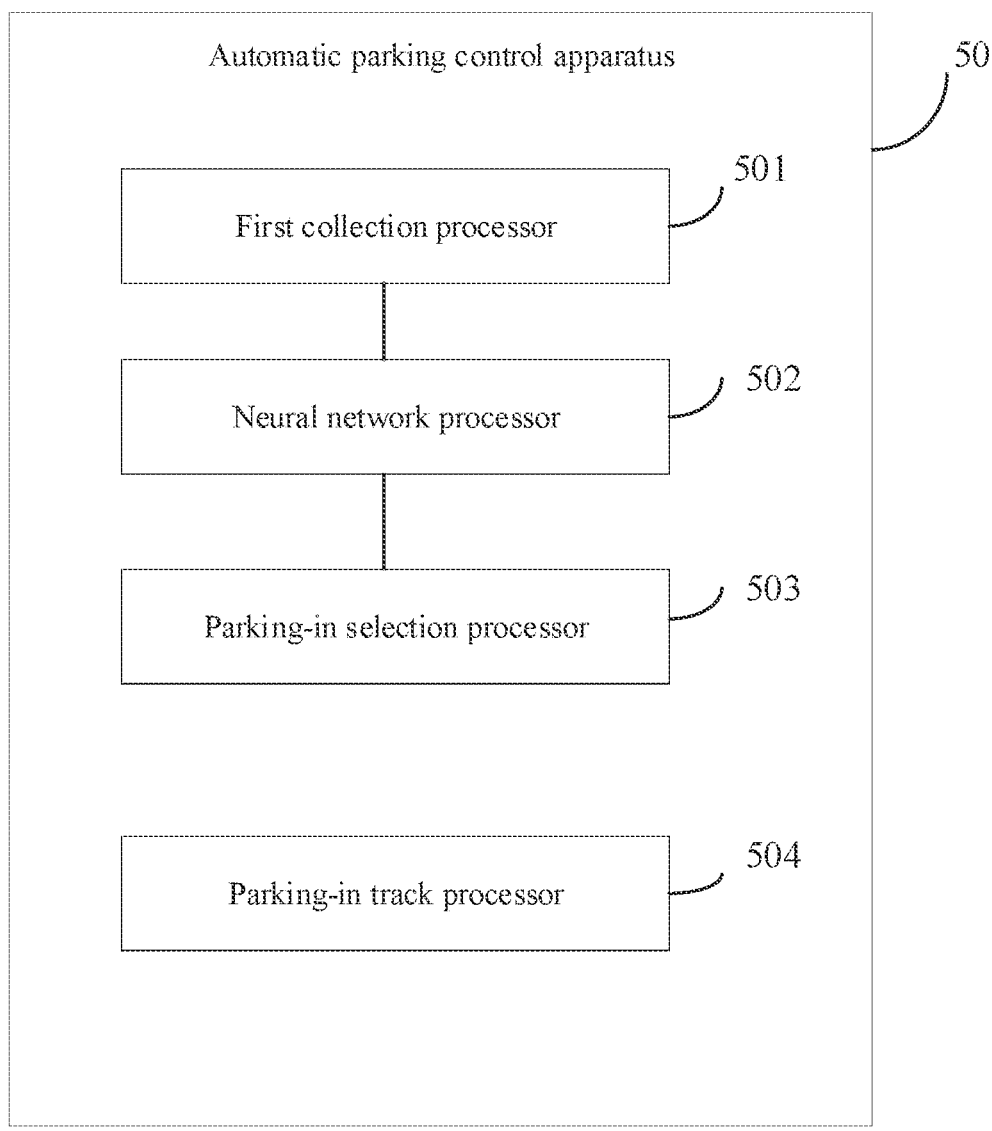
FIG. 15 is a structural block diagram of an automatic parking vehicle according to an embodiment of the present disclosure.

FIG. 15 illustrates a structural block diagram of an automatic parking control apparatus according to an embodiment of the present disclosure, which may specifically include the following modules:

a first collection processor 501 configured for, when a speed of the vehicle is in a preset speed range and a time that the speed of the vehicle is in the preset speed range is greater than or equal to a preset time, collecting image data and radar data around the vehicle through a sensor;

a neural network processor 502 configured for inputting the image data and the radar data into a preset convolutional neural network model to acquire at least one parking slot information output by the convolutional neural network model, wherein the convolutional neural network model is trained by image training data and radar training data collected in a plurality of parking slot scenes;

a parking-in selection processor 503 configured for, when a current gear of the vehicle is a forward gear or a neutral gear, selecting target parking slot information from the at least one parking slot information according to a received parking-in selection operation; and a parking-in track processor 504 configured for, according to the target parking slot information, generating a vehicle parking-in track for the vehicle to automatically park according to the vehicle parking-in track.

Optionally, the automatic parking control apparatus according to the present disclosure further includes:

a detection processor 505 configured for detecting working states of the plurality of image sensors, the plurality of radar sensors and an electronic control unit when the vehicle is started, wherein the working states include a normal state or a fault state; and a working level processor 506 configured for determining a working level of the vehicle according to the plurality of working states.

Optionally, the working level processor 506 includes:

a first sub-processor 5061 configured for determining that the working level of the vehicle is the normal level when the working states of the plurality of image sensors, the plurality of radar sensors and the electronic control unit are all the normal state;

a second sub-processor 5062 configured for determining that the working level of the vehicle is the first-grade fault level when the working state of at least one radar sensor and/or the electronic control unit is the fault state;

a third sub-processor 5063 configured for determining that the working level of the vehicle is the second-grade fault level when the working states of all the image sensors are the fault state; and a fourth sub-processor 5064 configured for determining that the working level of the vehicle is the third-grade fault level when the working states of some of the image sensors are the fault state.

Optionally, the automatic parking control apparatus according to the present disclosure further includes:

a first control processor 507 configured for controlling the electronic control unit to stop working when the working level of the vehicle is the first-grade fault level;

a second control processor 508 configured for controlling the image sensor to stop working when the working level of the vehicle is the second-grade fault level; and a third control processor 509 configured for controlling the image sensors the working states of which are the fault state to stop working when the working level of the vehicle is the third-grade fault level.

Optionally, the parking slot scenes include: one or more parking slot scenes with a traffic cone in the parking slot, a parking slot scene with a no-parking sign in the parking slot, a parking slot scene with a parking lock in the parking slot, a parking slot scene with a tag line in the parking slot and a parking slot scene with an obstacle in the parking slot.

Optionally, the neural network processor 502 includes:

an input submodule 5021 configured for inputting the image data and the radar data into the convolutional neural network model, so that the convolutional neural network model determines the parking slot information including a parking slot type according to the image data and the radar data; and a first output submodule 5022 configured for acquiring the parking slot information including the parking slot type output by the convolutional neural network model.

Optionally, the neural network processor 502 includes:

an oblique parking slot submodule 5023 configured for, when the parking slot type is an oblique parking slot, determining, by the convolutional neural network model, a parking direction specific to the oblique parking slot according to the image data and the radar data; wherein, the acquired parking slot information output by the convolutional neural network model further includes a parking direction of the oblique parking slot.

Optionally, the parking-in selection processor 503 includes:

a display submodule 5031 configured for, when a parking signal is received, when the current gear of the vehicle is the forward gear or the neutral gear, displaying a vehicle parking-in interface, wherein the vehicle parking-in interface includes the at least one parking slot information; and a selection submodule 5032 configured for, when the parking-in selection operation specific to the vehicle parking-in interface is received, selecting the target parking slot information from the at least one parking slot information according to the parking-in selection operation.

Optionally, the automatic parking control apparatus according to the present disclosure further includes:

a second collection processor 510 configured for, when the parking signal is received, when the current gear of the vehicle is a parking gear, collecting environmental data around the vehicle through the sensor;

a determining processor 511 configured for determining at least one parking-out direction of the vehicle according to the environmental data;

a display processor 512 configured for displaying a vehicle parking-out interface, the vehicle parking-out interface including the at least one parking-out direction;

a parking-out selection processor 513 configured for, when a parking-out selection operation is received, selecting a target parking-out direction from the parking-out direction according to the parking-out selection operation; and a parking-out track processor 514 configured for, according to the target parking-out direction, generating a vehicle parking-out track for the vehicle to automatically park according to the vehicle parking-out track.

Optionally, the automatic parking control apparatus according to the present disclosure further includes:

a parking suspension module 515 configured for, when the vehicle is in an abnormal state, controlling the vehicle to suspend automatic parking; and a parking continuing module 516 configured for, when the vehicle is out of the abnormal state, controlling the vehicle to continue automatic parking.

Optionally, the abnormal state includes at least one of the followings:

the vehicle being in a state that a seat belt of a driver seat is unfastened;

the vehicle being in a state that a door of the vehicle is unclosed; and a state that an obstacle appears in the vehicle parking-in track.

In conclusion, the automatic parking control apparatus provided by the present disclosure includes: when the speed of the vehicle is in the preset speed range and the time that the speed of the vehicle is in the preset speed range is greater than or equal to the preset time, collecting the image data and the radar data around the vehicle by the sensor; inputting the image data and the radar data into the preset convolutional neural network model to acquire the at least one parking slot information output by the convolutional neural network model, wherein the convolutional neural network model is trained by the image training data and the radar training data collected in the plurality of parking slot scenes; when the current gear of the vehicle is the forward gear or the neutral gear, selecting the target parking slot information from the at least one parking slot information according to the received parking-in selection operation; and according to the target parking slot information, generating the vehicle parking-in track for the vehicle to automatically park according to the vehicle parking-in track. In the present disclosure, parking slots around the vehicle may be searched in advance by detecting the speed of the vehicle, and parking slots that the vehicle may park in under various complicated conditions may also be identwhenied by the convolutional neural network model; and further, various parking requirements of a user may be met by providing a plurality of parking slots for parking, thereby perfecting an automatic parking system, and improving the driving experience of the user.

It may be clearly understood by a person skilled in the art that, for the sake of convenience and brevity, a detailed working process of the foregoing system, apparatus, and unit may Referring to a corresponding process in the foregoing method embodiments, and will not be elaborated herein.

Those described above are merely preferred embodiments of the present disclosure, but are not intended to limit the present disclosure. Any modifications and equivalent substitutions and improvements made without departing from the principle of the present disclosure shall all fall in the protection scope of the present disclosure.

The foregoing descriptions are merely detailed embodiments of the present disclosure, but the protection scope of the present disclosure is not limited thereto. Any changes or substitutions that may be easily thought of by those familiar with the technical field in the technical scope disclosed in the present disclosure should be covered by the protection scope of the present disclosure. Therefore, the protection scope of the present disclosure should be subjected to the protection scope of the claims.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as device or apparatus programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 16:
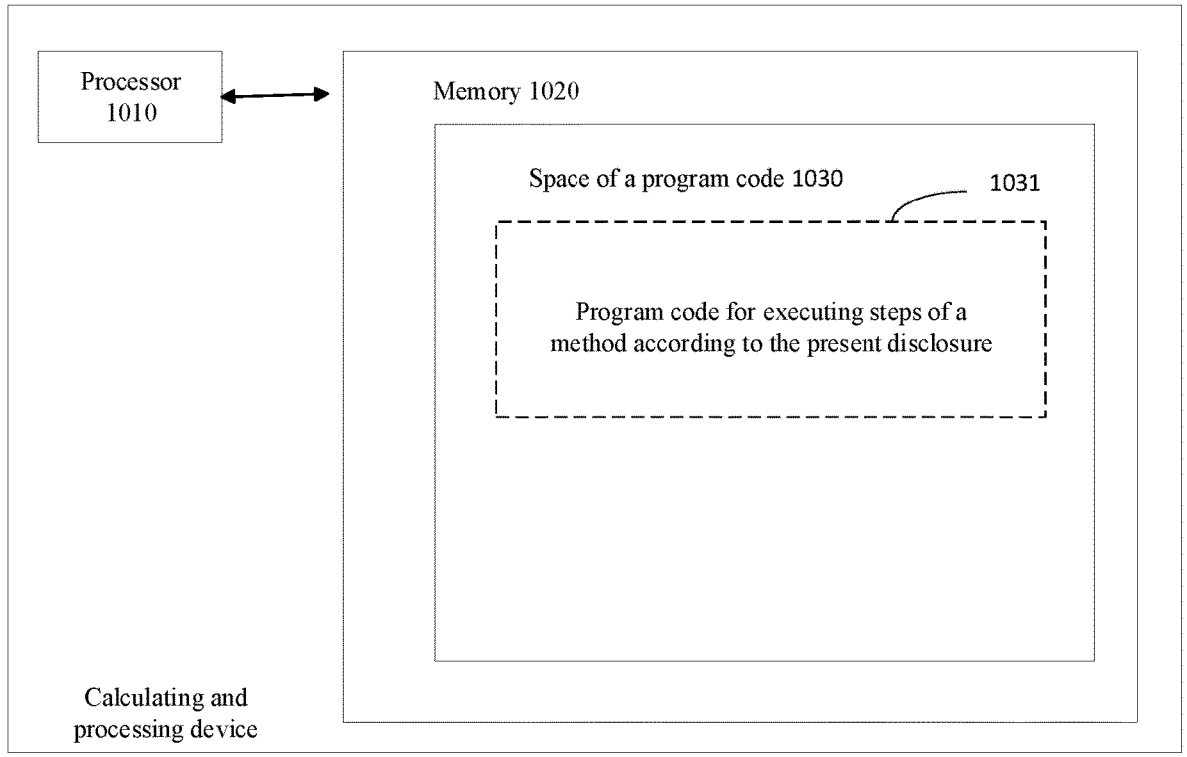
FIG. 16 schematically shows a block diagram of an automatic parking control apparatus for executing the method according to the present disclosure.
Figure 17:
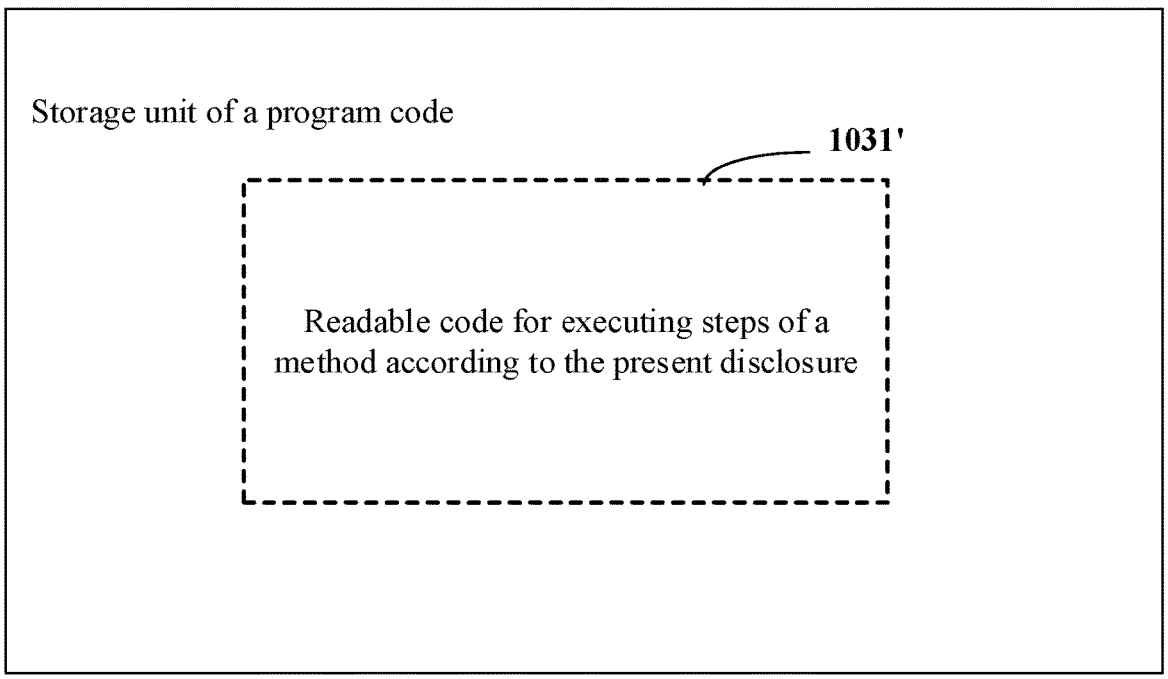
FIG. 17 schematically shows a storage unit for holding or carrying a program code for implementing the method according to the present disclosure.

For example, FIG. 16 shows an automatic parking control apparatus that may implement the method according to the present disclosure. The automatic parking control apparatus traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk. Such computer program products are usually portable or fixed storage units as shown in FIG. 17. The storage unit may have storage segments or storage spaces with similar arrangement to the memory 1020 of the automatic parking control apparatus in FIG. 16. The program codes may for example be compressed in a suitable form. Generally, the storage unit contains a computer-readable code 1031', which may be read by a processor like 1010. When those codes are executed by the automatic parking control apparatus, the codes cause the automatic parking control apparatus to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those apparatuses may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An automatic parking control method, wherein, the method is applied to a vehicle comprising a sensor, the method comprises:
    by using a first collection processor, when a speed of the vehicle is in a preset speed range, and time that the speed of the vehicle is in the preset speed range is greater than or equal to preset time, collecting image data and radar data around the vehicle through the sensor;
    by using a neural network processor, inputting the image data and the radar data into a preset convolutional neural network model to acquire at least one parking slot information output by the convolutional neural network model, wherein the convolutional neural network model is trained by image training data and radar training data collected in a plurality of parking slot scenes;
    by using a parking-in selection processor, when a current gear of the vehicle is a forward gear or a neutral gear, selecting target parking slot information from the at least one parking slot information according to a received parking-in selection operation; and
    by using a parking-in track processor, according to the target parking slot information, generating a vehicle parking-in track for the vehicle to automatically park according to the vehicle parking-in track.

2. The method according to claim 1, wherein the sensor comprises a plurality of image sensors and a plurality of radar sensors, the vehicle comprises an electronic control unit, and before the step of, when the speed of the vehicle is in the preset speed range and the time that the speed of the vehicle is in the preset speed range is greater than or equal to the preset time, collecting the image data and the radar data around the vehicle through the sensor, the method further comprises:
    by using a detection processor, detecting working states of the plurality of image sensors, the plurality of radar sensors and the electronic control unit when the vehicle is started, wherein the working states comprise a normal state or a fault state; and
    by using a working level processor, determining a working level of the vehicle according to the plurality of working states.

3. The method according to claim 2, wherein the working level of the vehicle comprises any one of a normal level, a first-grade fault level, a second-grade fault level or a third-grade fault level, and the step of by using a working level processor, determining the working level of the vehicle according to the plurality of working states comprises:
    determining that the working level of the vehicle is the normal level when the working states of the plurality of image sensors, the plurality of radar sensors and an electronic control unit are all the normal state;
    determining that the working level of the vehicle is the first-grade fault level when the working state of at least one radar sensor and/or the electronic control unit is the fault state;

determining that the working level of the vehicle is the second-grade fault level when the working states of all the image sensors are the fault state; and determining that the working level of the vehicle is the third-grade fault level when the working states of some of the image sensors are the fault state.

4. The method according to claim 3, wherein the electronic control unit is configured for controlling the vehicle to park automatically, and after the step of by using a working level processor, determining the working level of the vehicle according to the plurality of working states, the method further comprises:

controlling the electronic control unit to stop working when the working level of the vehicle is the first-grade fault level;

controlling the image sensors to stop working when the working level of the vehicle is the second-grade fault level; and controlling the image sensors which the working states are the fault state to stop working when the working level of the vehicle is the third-grade fault level.

5. The method according to claim 1, wherein the parking slot scenes comprise: one or more of a parking slot scene with a traffic cone in the parking slot, a parking slot scene with a no-parking sign in the parking slot, a parking slot scene with a parking lock in the parking slot, a parking slot scene with a tag line in the parking slot or a parking slot scene with an obstacle in the parking slot.

6. The method according to claim 1, wherein the step of by using a neural network processor, inputting the image data and the radar data into the preset convolutional neural network model to acquire the at least one parking slot information output by the convolutional neural network model comprises:

inputting the image data and the radar data into the convolutional neural network model, so that the convolutional neural network model determines the parking slot information comprising a parking slot type according to the image data and the radar data; and acquiring the parking slot information comprising the parking slot type output by the convolutional neural network model.

7. The method according to claim 6, wherein after the step that the convolutional neural network model determines the parking slot information comprising the parking slot type according to the image data and the radar data, the method further comprises:

when the parking slot type is an oblique parking slot, determining, by the convolutional neural network model, a parking direction for the oblique parking slot according to the image data and the radar data;

wherein, the acquired parking slot information output by the convolutional neural network model further comprises a parking direction of the oblique parking slot.

8. The method according to claim 1, wherein the step of, by using a parking-in selection processor, when the current gear of the vehicle is the forward gear or the neutral gear, selecting the target parking slot information from the at least one parking slot information according to the received parking-in selection operation, comprises:

when a parking signal is received, and the current gear of the vehicle is the forward gear or the neutral gear, displaying a vehicle parking-in interface, the vehicle parking-in interface comprising the at least one parking slot information; and when the parking-in selection operation for the vehicle parking-in interface is received, selecting the target parking slot information from the at least one parking slot information according to the parking-in selection operation.

9. The method according to claim 1, wherein after the step of, by using a parking-in track processor, according to the target parking slot information, generating the vehicle parking-in track for the vehicle to automatically park according to the vehicle parking-in track, the method further comprises:

when the parking signal is received, and the current gear of the vehicle is a parking gear, collecting environmental data around the vehicle through the sensor;

determining at least one parking-out direction of the vehicle according to the environmental data;

displaying a vehicle parking-out interface, the vehicle parking-out interface comprising the at least one parking-out direction;

when a parking-out selection operation is received, selecting a target parking-out direction from the parking-out direction according to the parking-out selection operation; and according to the target parking-out direction, generating a vehicle parking-out track for the vehicle to automatically park according to the vehicle parking-out track.

10. The method according to claim 1, wherein after the step of, by using a parking-in track processor, according to the target parking slot information, generating the vehicle parking-in track for the vehicle to automatically park according to the vehicle parking-in track, the method further comprises:

when the vehicle is in an abnormal state, controlling the vehicle to suspend automatic parking; and when the vehicle is out of the abnormal state, controlling the vehicle to continue automatic parking.

11. The method according to claim 10, wherein the abnormal state comprises at least one of the followings:

the vehicle being in a state that a seat belt of a driver seat is unfastened;

the vehicle being in a state that a door of the vehicle is unclosed; and a state that an obstacle appears in the vehicle parking-in track.

12. An automatic parking control apparatus, comprising:

a first collection processor configured for, when a speed of the vehicle is in a preset speed range and time that the speed of the vehicle is in the preset speed range is greater than or equal to a preset time, collecting image data and radar data around the vehicle through a sensor;

a neural network processor configured for inputting the image data and the radar data into a preset convolutional neural network model to acquire at least one parking slot information output by the convolutional neural network model, wherein the convolutional neural network model is trained by image training data and radar training data collected in a plurality of parking slot scenes;

a parking-in selection processor configured for, when a current gear of the vehicle is a forward gear or a neutral gear, selecting target parking slot information from the at least one parking slot information according to a received parking-in selection operation; and a parking-in track processor configured for, according to the target parking slot information, generating a vehicle parking-in track for the vehicle to automatically park according to the vehicle parking-in track.

13. The apparatus according to claim 12, further comprising:
   a detection processor configured for detecting working states of the plurality of image sensors, the plurality of radar sensors and an electronic control unit when the vehicle is started, wherein the working states comprise a normal state or a fault state; and
   a working level processor configured for determining a working level of the vehicle according to the plurality of working states.

14. The apparatus according to claim 13, wherein the working level processor comprises:
   a first sub-processor configured for determining that the working level of the vehicle is the normal level when the working states of the plurality of image sensors, the plurality of radar sensors and the electronic control unit are all the normal state;
   a second sub-processor configured for determining that the working level of the vehicle is the first-grade fault level when the working state of at least one radar sensor and/or the electronic control unit is the fault state;
   a third sub-processor configured for determining that the working level of the vehicle is the second-grade fault level when the working states of all the image sensors are the fault state; and
   a fourth sub-processor configured for determining that the working level of the vehicle is the third-grade fault level when the working states of some of the image sensors are the fault state.

15. The apparatus according to claim 14, further comprising:
   a first control processor configured for controlling the electronic control unit to stop working when the working level of the vehicle is the first-grade fault level;
   a second control processor configured for controlling the image sensor to stop working when the working level of the vehicle is the second-grade fault level; and
   a third control processor configured for controlling the image sensors which the working states are the fault state to stop working when the working level of the vehicle is the third-grade fault level.

16. The apparatus according to claim 12, further comprising:
   a second collection processor configured for, when the parking signal is received, and the current gear of the vehicle is a parking gear, collecting environmental data around the vehicle through the sensor;
   a determining processor configured for determining at least one parking-out direction of the vehicle according to the environmental data;
   a display processor configured for displaying a vehicle parking-out interface, the vehicle parking-out interface comprising the at least one parking-out direction;
   a parking-out selection processor configured for, when a parking-out selection operation is received, selecting a target parking-out direction from the parking-out direction according to the parking-out selection operation; and
   a parking-out track processor configured for, according to the target parking-out direction, generating a vehicle parking-out track for the vehicle to automatically park according to the vehicle parking-out track.

17. The apparatus according to claim 12, wherein the apparatus further comprises:
   a memory in which a computer-readable code is stored; and
   the memory is executed by all or any one of the first collection processor, the neural network processor, the parking-in selection processor and/or the parking-in track processor.

18. A non-transitory computer-readable medium storing the computer program, when the computer program for signal measuring is executed by an electronic device, the method comprises:
   by using a first collection processor, when a speed of the vehicle is in a preset speed range, and time that the speed of the vehicle is in the preset speed range is greater than or equal to preset time, collecting image data and radar data around the vehicle through the sensor;
   by using a neural network processor, inputting the image data and the radar data into a preset convolutional neural network model to acquire at least one parking slot information output by the convolutional neural network model, wherein the convolutional neural network model is trained by image training data and radar training data collected in a plurality of parking slot scenes;
   by using a parking-in selection processor, when a current gear of the vehicle is a forward gear or a neutral gear, selecting target parking slot information from the at least one parking slot information according to a received parking-in selection operation; and
   by using a parking-in track processor, according to the target parking slot information, generating a vehicle parking-in track for the vehicle to automatically park according to the vehicle parking-in track.

19. The apparatus according to claim 12, wherein the apparatus further comprises:
   a memory in which a computer-readable code is stored; and
   the memory is executed by all or any one of the second collection processor, the determining processor, the display processor and/or the parking-out selection processor and the parking-out track processor.

* * * * *